(12) United States Patent
Daga et al.

(10) Patent No.: US 11,636,130 B2
(45) Date of Patent: Apr. 25, 2023

(54) AUTO-GRANULARITY FOR MULTI-DIMENSIONAL DATA

(71) Applicant: Oracle International Corporation, Redwood Shores, CA (US)

(72) Inventors: Manish Daga, Bangalore (IN); Shivaranjan Gurunanjappa, Gubbalala (IN); Nirvi Badyal, Jammu and Kashmir (IN)

(73) Assignee: Oracle International Corporation, Redwood Shores, CA (US)

( * ) Notice: Subject to any disclaimer, the term of this patent is extended or adjusted under 35 U.S.C. 154(b) by 921 days.

(21) Appl. No.: 16/146,123

(22) Filed: Sep. 28, 2018

(65) Prior Publication Data

US 2019/0102442 A1    Apr. 4, 2019

(30) Foreign Application Priority Data

Sep. 29, 2017    (IN) .............................. 201741034665

(51) Int. Cl.
*G06F 16/25* (2019.01)
*G06Q 10/04* (2023.01)
(Continued)

(52) U.S. Cl.
CPC ........ *G06F 16/258* (2019.01); *G06F 16/2365* (2019.01); *G06F 16/282* (2019.01); *G06F 16/283* (2019.01); *G06F 17/153* (2013.01); *G06Q 10/04* (2013.01); *G06F 3/04847* (2013.01)

(58) Field of Classification Search
None
See application file for complete search history.

(56) References Cited

U.S. PATENT DOCUMENTS 7,092,929 B1    8/2006  Dvorak et al.
7,480,623 B1    1/2009  Landvater
(Continued)

OTHER PUBLICATIONS

"Forecasting", SAP Help Portal, SAP ERP (/viewer/product/SAP_ERP/6.18.06/en-US), SAP for Professional Services, downloaded Oct. 16, 2017.
(Continued)

*Primary Examiner* — Amy Ng
*Assistant Examiner* — Mellissa M. Ohba
(74) *Attorney, Agent, or Firm* — Potomac Law Group, PLLC

(57) ABSTRACT

Planning granularities can be stored for data elements including a first granularity for a first data combination, the first data combination including a combination of multiple dimensions of data. A comparison metric can be calculated between planned data at the first granularity for the first data combination and actual data observed for the first data combination, wherein the observed data is stored at a different granularity than the planned data. Based on the calculated comparison, the planning granularity for the first data combination can be adjusted from the first granularity to a second granularity. A selection of a cross-section of data spanning multiple dimensions can be received, the selection including the first data combination, wherein a user interface is configured to display data for the first data element at the second granularity based on the adjusting.

20 Claims, 22 Drawing Sheets

(51) Int. Cl.
  *G06F 17/15* (2006.01)
  *G06F 16/28* (2019.01)
  *G06F 16/23* (2019.01)
  *G06F 3/04847* (2022.01)

(56) References Cited

U.S. PATENT DOCUMENTS

| | | | |
|---|---|---|---|
| 7,644,009 B2 | 1/2010 | Amerasinghe et al. | |
| 7,657,540 B1* | 2/2010 | Bayliss | G06Q 10/10 |
| | | | 707/726 |
| 8,364,676 B2 | 1/2013 | Handy et al. | |
| 10,936,619 B2* | 3/2021 | Daga | G06F 16/2365 |
| 2008/0172287 A1 | 7/2008 | Tien et al. | |
| 2010/0205024 A1 | 8/2010 | Shachar et al. | |
| 2010/0287146 A1 | 11/2010 | Skelton et al. | |
| 2012/0197686 A1 | 8/2012 | Ata | |
| 2013/0007011 A1* | 1/2013 | Setlur | G06F 16/24575 |
| | | | 707/E17.084 |
| 2015/0058077 A1 | 2/2015 | Buban et al. | |
| 2015/0213109 A1 | 7/2015 | Kassko et al. | |
| 2015/0379449 A1 | 12/2015 | Gopinath et al. | |
| 2016/0019482 A1 | 1/2016 | Venhoff et al. | |
| 2016/0092810 A1 | 3/2016 | Chatterjee et al. | |
| 2016/0127539 A1 | 5/2016 | Sharma | |
| 2016/0171540 A1 | 6/2016 | Mangipudi et al. | |
| 2016/0321616 A1* | 11/2016 | Gedge | G06N 5/025 |
| 2016/0358065 A1* | 12/2016 | Gedge | G06N 20/00 |
| 2017/0140319 A1 | 5/2017 | Gottemukkala et al. | |
| 2017/0140402 A1 | 5/2017 | Doi | |
| 2017/0169092 A1 | 6/2017 | Baird et al. | |
| 2017/0235657 A1 | 8/2017 | Goettge et al. | |
| 2018/0189990 A1* | 7/2018 | Cardno | G06Q 10/10 |
| 2018/0315060 A1* | 11/2018 | Sheppard | G06Q 30/0203 |
| 2019/0102422 A1* | 4/2019 | Daga | G06Q 10/04 |

OTHER PUBLICATIONS

Unknown, SAP Help Portal, "Enhanced Forecasting Objects", Version 6.0 EHP8 SP06, Retrieved from: https://help.sap.com/viewer/1db360e2b9af40c488cc47df487a2ca3/6.18.06/en-US/a3c75749af48480d91c22050382c2bbc.html on Mar. 19, 2018.

Stefan De Kok, "Should You Forecast Monthly or Weekly?", Published on Nov. 9, 2016, Retrieved from: https://www.linkedin.com/pulse/should-you-forecast-monthly-weekly-stefan-de-kok on Mar. 19, 2018.

* cited by examiner

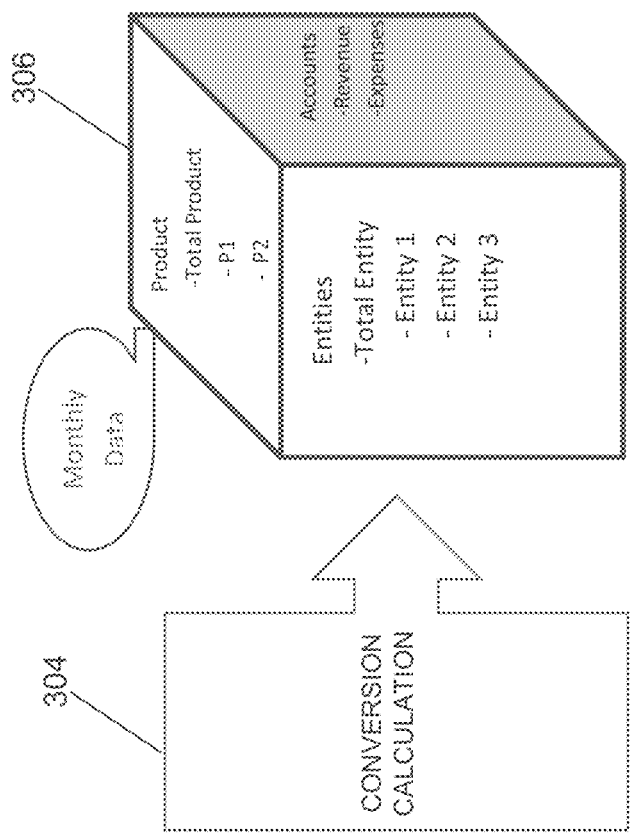
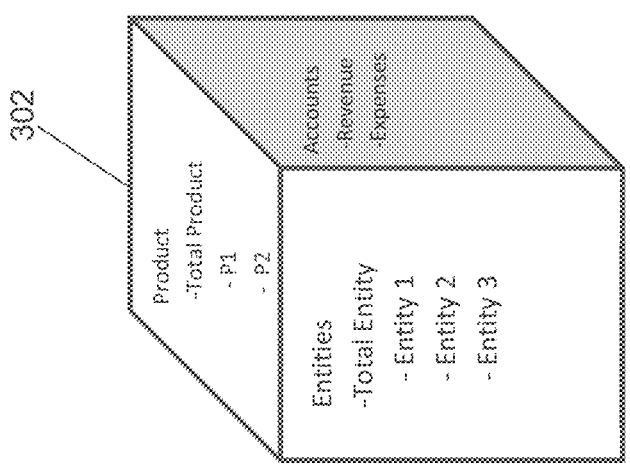
Fig. 3

1602

"BegBalance" "Yearly Plan" "Qtrly 1" "Qtrly 2" "Qtrly 3" "Qtrly 4" "Jan" "Feb" "Mar" "Apr" "May" "Jun" "Jul" "Aug" "Sep" "Oct" "Nov" "Dec"
"Entity 2" "OFS Load" "FY18" "Actual" "Working" "USD"
"OFS_Product Revenue" "#Missing" "#Missing" "#Missing" "#Missing" "#Missing" 10200 1500000 10000 200000 3000 232
"OFS_Current Liability" "#Missing" "#Missing" "#Missing" "#Missing" "#Missing" 2000000 1250000 1250000 1250000 1250
"OFS_Labor Expense" "#Missing" "#Missing" "#Missing" "#Missing" "#Missing" 400 400 400 400 400 400 400 400 400
"OFS_Travel Expense" "#Missing" "#Missing" "#Missing" "#Missing" "#Missing" 400 400 400 400 400 400 400 400 400
"OFS_Service Revenue" "#Missing" "#Missing" "#Missing" "#Missing" "#Missing" 52000 50000 550000 50000 50000 5500

1604

"BegBalance" "Yearly Plan" "Qtrly 1" "Qtrly 2" "Qtrly 3" "Qtrly 4" "Jan" "Feb" "Mar" "Apr" "May" "Jun" "Jul" "Aug" "Sep" "Oct" "Nov" "Dec"
"Entity 2" "OFS Load" "FY18" "Actual" "Working" "USD"
"OFS_Product Revenue" "#Missing" "#Missing" "#Missing" "#Missing" "#Missing" 10200 1500000 10000 200000 3000 232
"OFS_Current Liability" "#Missing" "#Missing" "#Missing" "#Missing" "#Missing" 2000000 1250000 1250000 1250000 1250
"OFS_Labor Expense" "#Missing" "#Missing" "#Missing" "#Missing" "#Missing" 400 400 400 400 400 400 400 400 400
"OFS_Travel Expense" "#Missing" "#Missing" "#Missing" "#Missing" "#Missing" 400 400 400 400 400 400 400 400 400
"OFS_Service Revenue" "#Missing" "#Missing" "#Missing" "#Missing" "#Missing" 52000 50000 550000 50000 50000 5500

FIG. 16

| Entity | Account | Current_Granularity | Prior_Suggestion |
|---|---|---|---|
| Entity 1 | OFS_Product Revenue | 3 | 2 |
| Entity 1 | OFS_Labor Expense | 3 | 2 |
| Entity 1 | OFS_Service Revenue | 3 | 3 |
| Entity 1 | OFS_Current Liability | 3 | 2 |
| Entity 1 | OFS_Travel Expense | 3 | 3 |
| Entity 2 | OFS_Product Revenue | 3 | 2 |
| Entity 2 | OFS_Labor Expense | 3 | 3 |
| Entity 2 | OFS_Service Revenue | 3 | 3 |
| Entity 2 | OFS_Travel Expense | 3 | 3 |
| Entity 2 | OFS_Current Liability | 3 | 2 |

| Entity | Account | Variance | Contribution | Variance_Contribution | High_Variance_Frequency |
|---|---|---|---|---|---|
| Entity 1 | OFS_Product Revenue | 5 | 20 | 20 | 2 |
| Entity 1 | OFS_Labor Expense | 5 | 20 | 20 | 2 |
| Entity 1 | OFS_Service Revenue | 5 | 20 | 20 | 2 |
| Entity 1 | OFS_Current Liability | 5 | 20 | 20 | 2 |
| Entity 1 | OFS_Travel Expense | 2 | 5 | 20 | 2 |
| Entity 2 | OFS_Product Revenue | 5 | 20 | 20 | 2 |
| Entity 2 | OFS_Labor Expense | 5 | 20 | 20 | 2 |
| Entity 2 | OFS_Service Revenue | 5 | 20 | 10 | 2 |
| Entity 2 | OFS_Travel Expense | 2 | 5 | 20 | 2 |
| Entity 2 | OFS_Current Liability | 5 | 20 | 20 | 2 |
| DEFAULT | DEFAULT | 5 | 20 | 20 | 2 |

Fig. 18

| Entity | Account | Current_Granularity Suggestion Based on Rules | Reason for Suggestion |
|---|---|---|---|
| Entity 1 | OFS_Product Revenue | 3 | 2 [['High Plan vs Actual Variance Frequency', 'High Contribution Variance %']] |
| Entity 1 | OFS_Current Liability | 3 | 2 [['High Plan vs Actual Variance Frequency']] |
| Entity 1 | OFS_Labor Expense | 3 | 3 [['High Plan vs Actual Variance Frequency', 'Contribution %', 'High Contribution Variance %']] |
| Entity 1 | OFS_Travel Expense | 3 | |
| Entity 1 | OFS_Service Revenue | 3 | 2 [['High Contribution %', 'High Contribution Variance %']] |
| Entity 2 | OFS_Product Revenue | 3 | 3 [['High Plan vs Actual Variance Frequency', 'Contribution %', 'High Contribution Variance %']] |
| Entity 2 | OFS_Current Liability | 3 | 2 [['High Plan vs Actual Variance Frequency']] |
| Entity 2 | OFS_Labor Expense | 3 | |
| Entity 2 | OFS_Travel Expense | 3 | |
| Entity 2 | OFS_Service Revenue | 3 | 2 [['High Plan vs Actual Variance Frequency', 'High Contribution Variance %']] |

1902 → Entity; 1904 → Account; 1906 → Current_Granularity; 1908 → Suggestion Based on Rules; 1910 → Reason for Suggestion

Fig. 19

AUTO-GRANULARITY FOR MULTI-DIMENSIONAL DATA

FIELD

The embodiments of the present disclosure generally relate to configuring data granularities for multi-dimensional data.

BACKGROUND

Data planning, analytics, and processing for entities and/or scenarios can be performed over various intervals or granularities, such as daily, weekly, monthly, quarterly, yearly, and the like. Different circumstances may call for different granularities, such as manufacturing expenses being planned weekly while profit and loss are planned monthly. Further, complex multi-dimensional data models can include an unquantifiable number of potential intersections of data. For example, forecasting scenarios that enable powerful modeling for decision makers can include endless potential cross-sections of data. When related data concepts are tracked, planned, or forecasted using different granularities, managing data interactions in a multi-dimensional data model can be especially challenging.

SUMMARY

Embodiments include methods and systems for configuring data granularities for multi-dimensional data. Planning granularities can be stored for data elements including a first granularity for a first data combination, the first data combination including a combination of multiple dimensions of data, wherein a user interface is configured to display data for the first data combination at the first granularity. A comparison metric can be calculated between planned data at the first granularity for the first data combination and actual data observed for the first data combination, wherein the observed data is stored at a different granularity than the planned data. Based on the calculated comparison, the planning granularity for the first data combination can be adjusted from the first granularity to a second granularity. A selection of a cross-section of data spanning a plurality of dimensions in the multi-dimensional data model can be received, the selection including the first data combination, wherein a user interface is configured to display data for the first data element at the second granularity based on the adjusting.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 3 illustrates a mapping between data cubes for managing different data granularities according to another example embodiment.

FIG. 16 illustrates sample plan and observed data according to an embodiment.

FIG. 17 illustrates current and prior suggested planning granularities according to an embodiment.

FIG. 18 illustrates comparison metric thresholds for combinations of data according to an embodiment.

FIG. 19 illustrates auto-granularity suggestions for combinations of driver dimensions according to an embodiment.

DETAILED DESCRIPTION

Figure 1:
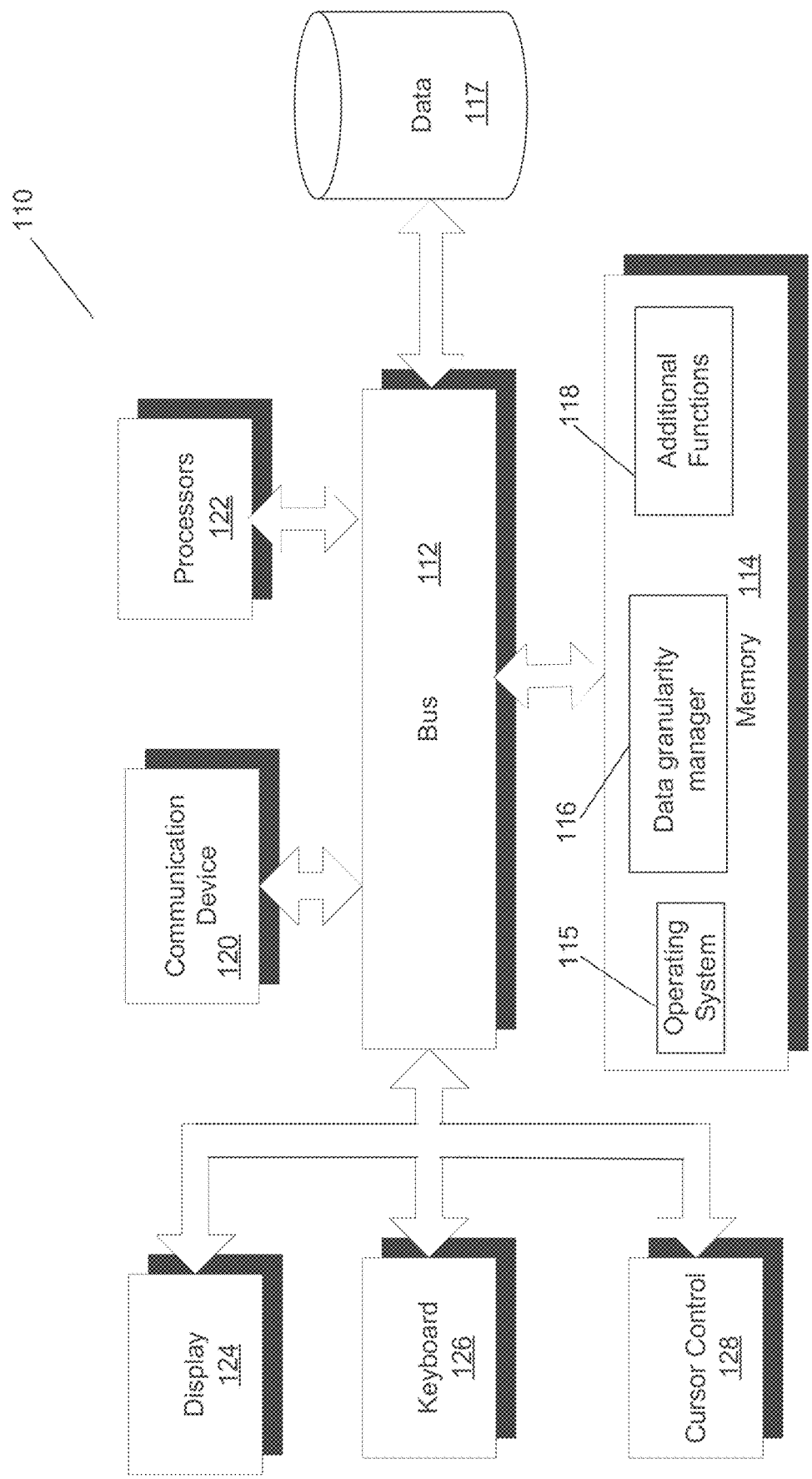
FIG. 1 illustrates a block diagram of a computing device operatively coupled to a mixed granularity data management system according to an example embodiment.

Embodiments configure data granularities for multi-dimensional data. For example, a first data element can have a weekly granularity while a second data element has a monthly, quarterly, or yearly granularity. Selections can be received for cross-sections of data that involve, for example, the display of various data elements and/or combinations of data elements. In some embodiments, the data model can include a plurality of dimensions of data, such as entity, accounts, products, scenario, year, period, and the like. An example selected cross-section of data can include a combination of a given scenario, entity, and account. Embodiments include managing data granularities by generating a plurality of rules for valid data combinations that can be used to filter the data retrieval.

In some embodiments, granularity for combinations of data can be automatically configured. For example, software can be implemented that accomplishes planning, such as planning scenarios for an organization. In some embodiments, data granularities can include granularities for combinations of planning data. For example, one of the dimensions of the multi-dimensional data model can be scenario, and the scenario dimension can include one or more member planning scenarios. A planning granularity for various cross-sections of data with a member planning scenario can be set.

In some embodiments, observed data can be compared to the planned data at the set planning granularity. For example, one or more data metrics can be calculated based on the comparison of data. Using the one or more data metrics, planning granularities can be adjusted. For example, planning granularities for cross-sections of data can be automatically adjusted when a comparison between the observed data for the cross-section and the planned data at the set planning granularity indicates that a finer planning granularity would result in improved performance.

Some embodiments include a hierarchical multi-dimensional data model, where the plurality of rules for valid data combinations can include specific rules about parent nodes and child nodes. Thus, the valid combination rules can be used to manage mixed granularities among combinations of hierarchical data elements. In these embodiments, the hierarchical multi-dimensional data model can also include planning data with planning granularities that can be automatically set based on comparisons with observed data.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 is a block diagram of a computer server/system 110 in accordance with embodiments. As shown in FIG. 1, system 110 may include a bus device 112 and/or other communication mechanism(s) configured to communicate information between the various components of system 110, such as processor 122 and memory 114. In addition, communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth®, Wi-Fi, and/or cellular communications. Alternatively, communication device 120 may be configured to provide wired network connection(s), such as an Ethernet connection.

Processor 122 may include one or more general or specific purpose processors to perform computation and control functions of system 110. Processor 122 may include a single integrated circuit, such as a micro-processing device, or may include multiple integrated circuit devices and/or circuit boards working in cooperation to accomplish the functions of processor 122. In addition, processor 222 may execute computer programs, such as operating system 115, data granularity manager 116, and other applications 118, stored within memory 114.

System 110 may include memory 114 for storing information and instructions for execution by processor 122. Memory 114 may contain various components for retrieving, presenting, modifying, and storing data. For example, memory 114 may store software modules that provide functionality when executed by processor 122. The modules may include an operating system 115 that provides operating system functionality for system 110. The modules can include an operating system 115, data granularity manager 116, as well as other applications modules 118. Operating system 115 provides operating system functionality for system 110. Data granularity manager 116 may include one or more APIs that enables system calls for managing data granularity, or may further provide any other functionality of this disclosure. In some instances, data granularity manager 116 may be implemented as an in-memory configuration.

Non-transitory memory 114 may include a variety of computer-readable medium that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 122 is further coupled via bus 112 to a display 124, such as a Liquid Crystal Display ("LCD"). A keyboard 126 and a cursor control device 128, such as a computer mouse, are further coupled to communication device 112 to enable a user to interface with system 110.

In some embodiments, system 110 can be part of a larger system. Therefore, system 110 can include one or more additional functional modules 118 to include the additional functionality. Other applications modules 118 may include the various modules of the engagement engine ("EE") embedded in Oracle® Cloud or modules of Oracle® Enterprise Planning and Budgeting Cloud Service ("EPBCS"), for example. A database 117 is coupled to bus 112 to provide centralized storage for modules 116 and 118 and to store, for example, a multi-dimensional data model. Database 117 can store data in an integrated collection of logically-related records or files. Database 117 can be an operational database, an analytical database, a data warehouse, a distributed database, an end-user database, an external database, a navigational database, an in-memory database, a document-oriented database, a real-time database, a relational database, an object-oriented database, Hadoop File System ("HFDS"), or any other database known in the art.

Although shown as a single system, the functionality of system 110 may be implemented as a distributed system. For example, memory 114 and processor 122 may be distributed across multiple different computers that collectively represent system 110. In one embodiment, system 110 may be part of a device (e.g., smartphone, tablet, computer, etc.), and system 110 may provide software functionality.

In some embodiments, one or more devices may be in communication with system 100 and the system may function as a web server. Further, one or more components of system 100 may not be depicted in FIG. 1.

Figure 2:
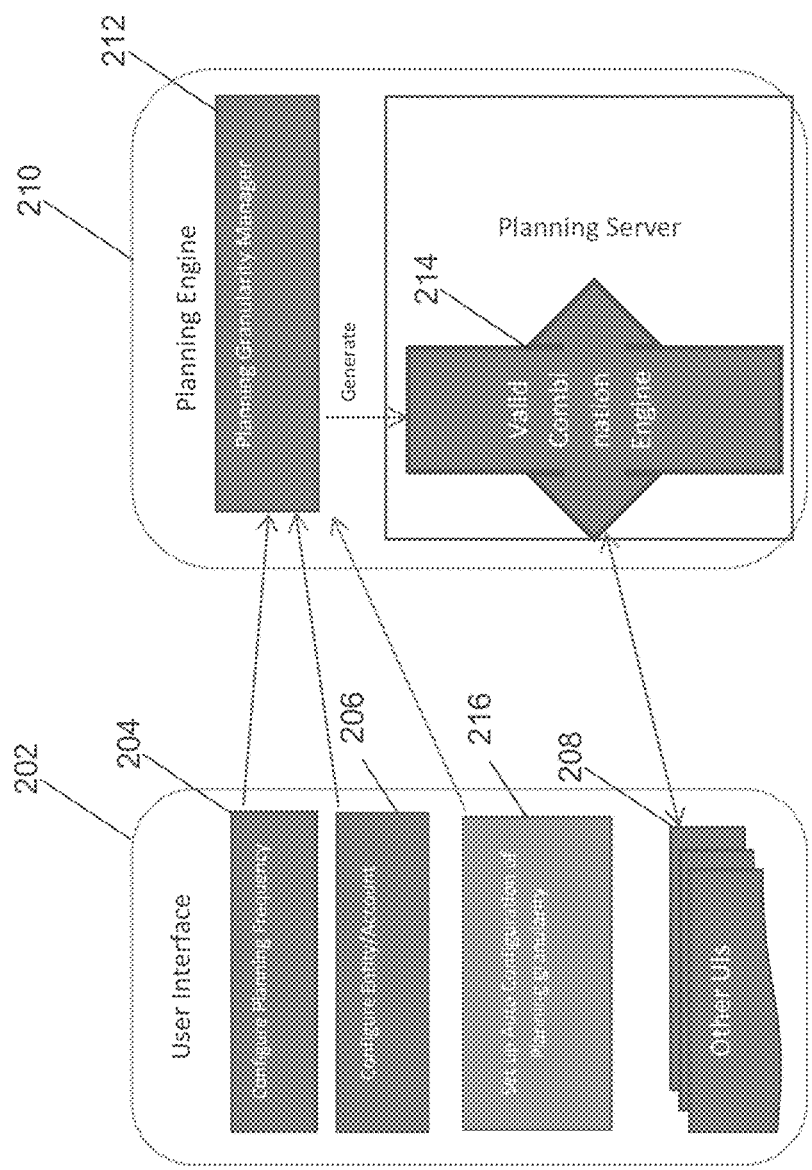
FIG. 2 illustrates a system for managing mixed data granularities for a multi-dimensional data model according to an example embodiment.

FIG. 2 illustrates a system for configuring data granularities for multi-dimensional data according to an example embodiment. User Interface 202 illustrates user interface elements that can be used to configure a granularity of data elements. For example, user interface 204 can be used to configure granularities for members of the dimension "Scenario", user interface 206 can be used to configure granularities members of the dimensions "Entity" and/or "Account', and/or user interface 216 can be used to set automatic granularity adjustments. FIGS. 4-7 and 13-15 illustrate additional embodiments of graphical user interfaces for configuring the granularity of data elements in the multi-dimensional data model.

Figure 11:
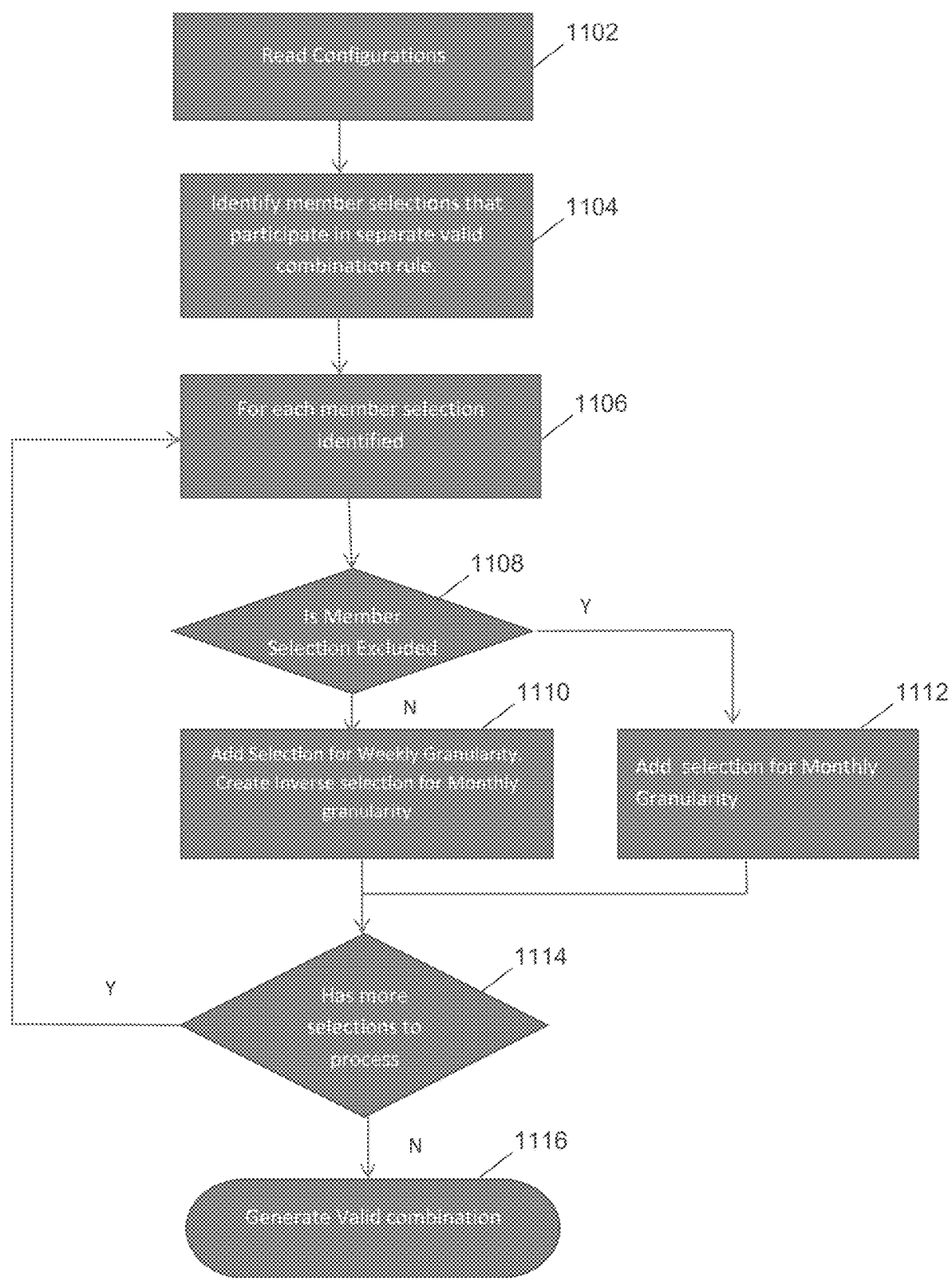
FIG. 11 illustrates an example flow diagram for determining invalid data combinations according to an example embodiment.

In some embodiments, planning engine 210 performs data processing for the multi-dimensional data model. For example, planning engine 210 can perform a number of functions, such as calculating, formatting, processing, and configuring views of cross-sections of the data elements of the data model. Planning engine 210 can also include valid combination engine 214. Valid combination engine 214 can generate a plurality of rules for evaluating the validity of various data elements, combinations of data elements, and/or combinations of dimensions of data across the data model. For example, data elements with mixed granularity may not be valid. FIG. 11 illustrates a flow diagram for generating rules for evaluating valid combinations according to an embodiment.

FIG. 3 illustrates a mapping between data cubes for managing different data granularities according to another example embodiment. For example, mixed granularities (e.g., weekly, monthly, quarterly, and the like) can be mapped back and forth to achieve functionality, such as display of a cross-section of the data model in a particular form or configuration. Conversion calculations disclosed herein can allow data elements of different granularities to be displayed together.

In some embodiments, cube 302 represents a multi-dimensional data model where each side of the cube represents different dimensions of data (e.g., Entity, Product, Account, Scenario, Year, Period, and the like). An example Entity dimension can include entity members of an organization, such as a country (e.g., US), which in turn can include child members country sales (e.g., US Sales), country manufacturing (e.g., US Manufacturing), and the like. An example Accounts dimension can include accounts members of an organization, such as Revenue, Profit, Expenses, and the like, where each can further include child account members. An example Year dimension can include members that are fiscal years, such as 2015, 2016, 2017, 2018, 2019, 2020, and the like. An example Scenario dimension can include members that represent various scenarios for an organization, such as a planning scenario, a forecasting scenario, a business use case scenario (e.g., such as planning a business change, like an acquisition), and the like. An example Currency dimension can include members that represent various world currencies. In some embodiments, currency can be input monthly or weekly, and exchange rates can also be input weekly or monthly and then used in the currency calculation when converting weeks to other granularities (e.g., months).

An example Period dimension can include members that are default granularities, such as weekly, monthly, quarterly, yearly, and the like. As will be described with reference to FIGS. 5A and 5B, 6, and 7, the Period dimension can define a granularity (e.g., planning granularity) for a given data element in some examples, and in other examples a data element specific granularity can be defined.

In some examples, members of these dimensions and/or combinations of members of these dimensions can represent data elements. For example, entity 1 can have a revenue account, an expense account, and the like. A combination of a given scenario, entity 1, and one of these accounts can be a data element. A plurality of combinations for members of these dimensions can be considered a cross-section of the multi-dimensional data.

In some embodiments, the various data elements within the multi-dimensional data model can have different granularities. For example, the revenue account of entity 1 can be have a weekly granularity while the expenses account of entity 2 can have a monthly planning granularity. Based on inputs received from a user, a cross-section of the multi-dimensional data can be requested for display, including combinations of data that include mixed data granularities. For example, the selection can request combinations between members of entities, accounts, and scenarios that have different granularities. In some embodiments, a granularity that is defined for a combination of a given dimension (or multiple dimensions) with the scenario dimension (e.g., specific plan, forecast, or business case scenario) can be a planning granularity. As will be further detailed with reference to FIG. 11, valid combination rules can be generated in order to filter certain invalid combinations when processing a selected cross-section.

In some embodiments, conversion calculations 304 can be used to map between different levels of granularity (e.g., weekly to monthly, monthly to weekly, and the like) to enable display within a given form. For example, cube 306 can represent multi-dimensional data after performed conversion calculations so that data of mixed granularity that represents the requested cross-section of data can be displayed. Conversion calculations will be further detailed below.

FIGS. 4-10 illustrate an example graphical user interfaces for managing mixed data granularities according to example embodiments. Example user interfaces provide for configuring granularities for various combinations of data, such as a combination of a first member of a first dimension and a second member of a second dimension. For example, members of the dimension Entity can be planned at different granularities when they are combined with members of the dimension Accounts. In this circumstance, a displayed user interface can provide configuration options for combinations of the Entity and Account dimensions, and a selection for different granularities of different combinations can be received. Similar functionality can be extended to different dimensions or combinations with a higher number of dimensions. The example graphical user interfaces depicted in FIGS. 4-10 can be displayed using a computing device, such as computer system 110. The user interface can leverage any suitable technologies to accomplish the described functionality.

Figure 4:
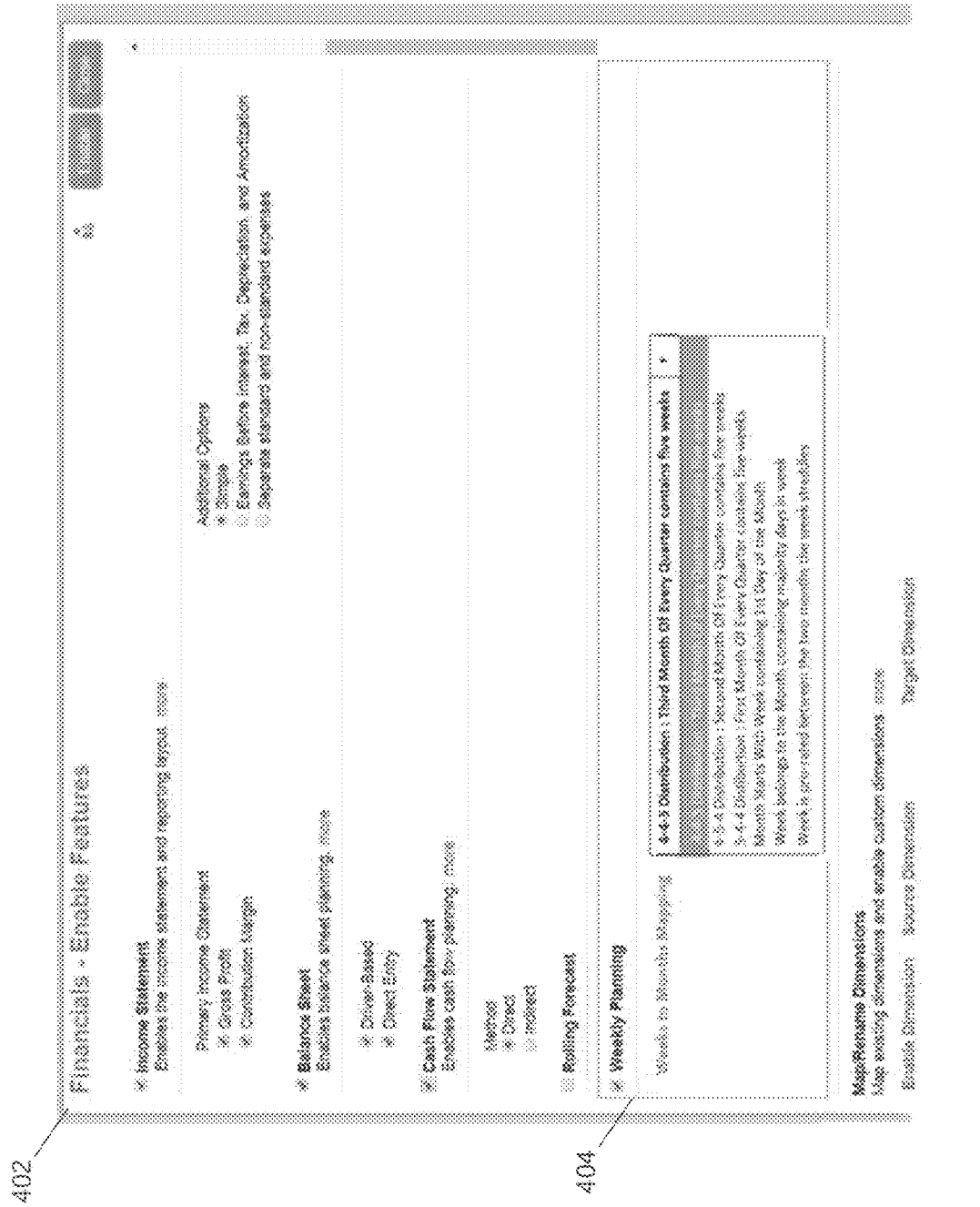
FIG. 4 illustrates an example graphical user interface for configuring data granularities according to an example embodiment.

FIGS. 4-7 illustrates example graphical user interfaces for configuring data granularities according to example embodiments. For example, a wizard that includes a plurality of graphical user interfaces can be used to configure data granularities in the multi-dimensional data model. With reference to FIG. 4, weekly granularity for some data elements can be configured by the provided user interfaces. User interface 402 illustrates a configuration interface for the multi-dimensional data and user interface element 404 illustrates a form for selecting weekly granularity and configuring the weekly granularity. For example, user interface element 404 can include a check box form for enabling weekly granularity and a drop down menu for selecting a configuration for the weekly granularity.

In some embodiments, at least 6 definition options are provided for weekly granularity: 4-4-5-4 weeks in first month, 4 weeks in second month, 5 weeks in third month and so on; 4-5-4-4 weeks in first month, 5 weeks in second month, 4 weeks in third month and so on; 5-4-4-5 weeks in first month, 4 weeks in second month, 4 weeks in third month and so on. The below table illustrates three examples of types of weekly definitions that can be implemented by embodiments.

|     | January | February | March | April | May | June | July | August | September | October | November | December |
|-----|---------|----------|-------|-------|-----|------|------|--------|-----------|---------|----------|----------|
| 445 | 4       | 4        | 5     | 4     | 4   | 5    | 4    | 4      | 5         | 4       | 4        | 5        |
| 454 | 4       | 5        | 4     | 4     | 5   | 4    | 4    | 5      | 4         | 4       | 5        | 4        |
| 544 | 5       | 4        | 4     | 5     | 4   | 4    | 5    | 4      | 4         | 5       | 4        | 4        |

In some embodiments, a new financial month can start with the week containing the 1st of that month. In other words, if one of the days in the reporting week contains the first day of a particular month, then that week "belongs" to that month. In some embodiments, the month can be determined by which month the majority of the days in that month belong. For example, if the week commences June 28th, then the week has three days in June and four in July—so this week "belongs" to July as more days in the week are from that month. In some embodiments, a week can be pro-rated between the two months the week straddles. For example, for weeks that have dates in two months, the output is assumed to accrue evenly over the period (e.g., for the week commencing June 28th three-sevenths of the output would be included in June and four-sevenths would be included in July).

Figure 5A:
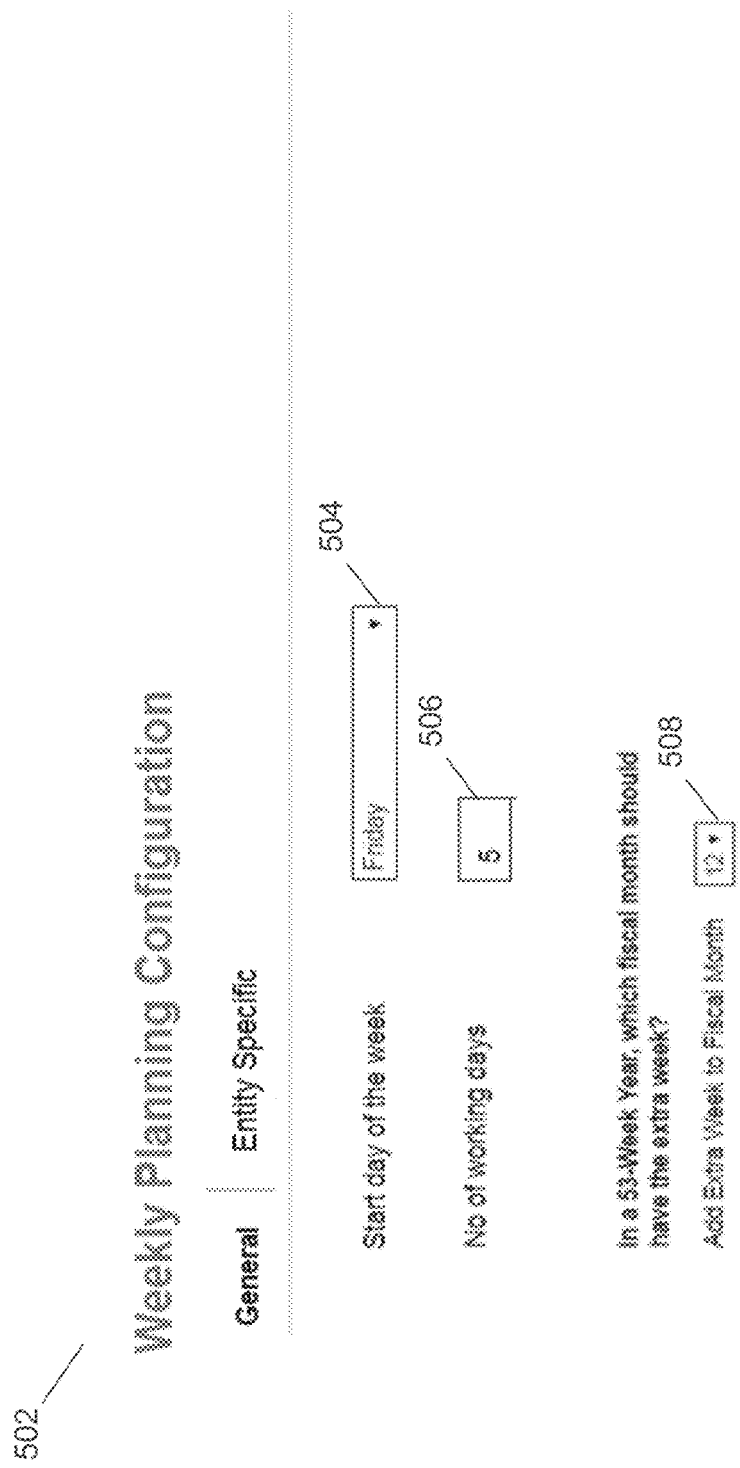
FIG. 5A illustrates an example graphical user interface for configuring a weekly data granularity according to an example embodiment.

Other suitable weekly granularity definitions can also be implemented. In addition, suitable mappings between weeks to quarters or years (e.g., based on the weeks to months mapping, and then months to quarters/years) can be implemented. With reference to FIG. 5A, the weekly granularity can further be defined by selecting additional configuration details. For example, for a given scenario (e.g., planning scenario), default weekly configuration details can be selected. In some embodiments, using user interface elements 504, 506, and 508, a start for the day of the week can be selected, a number of working day scan be selected, and a configuration for adding weeks to a month in a 53-week year can be selected.

Figure 5B:
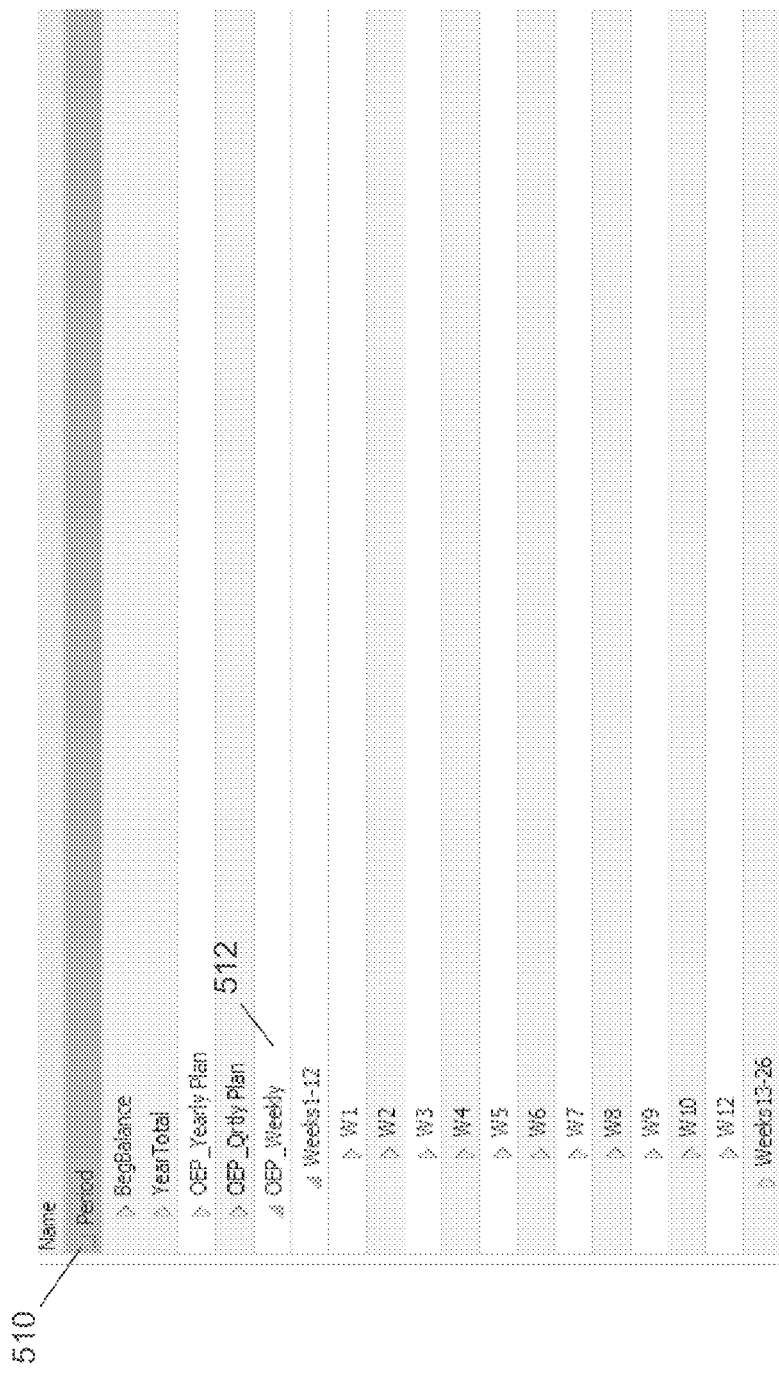
FIG. 5B illustrates an example implementation of a period dimension with a weekly configuration according to an example embodiment.
Figure 6:
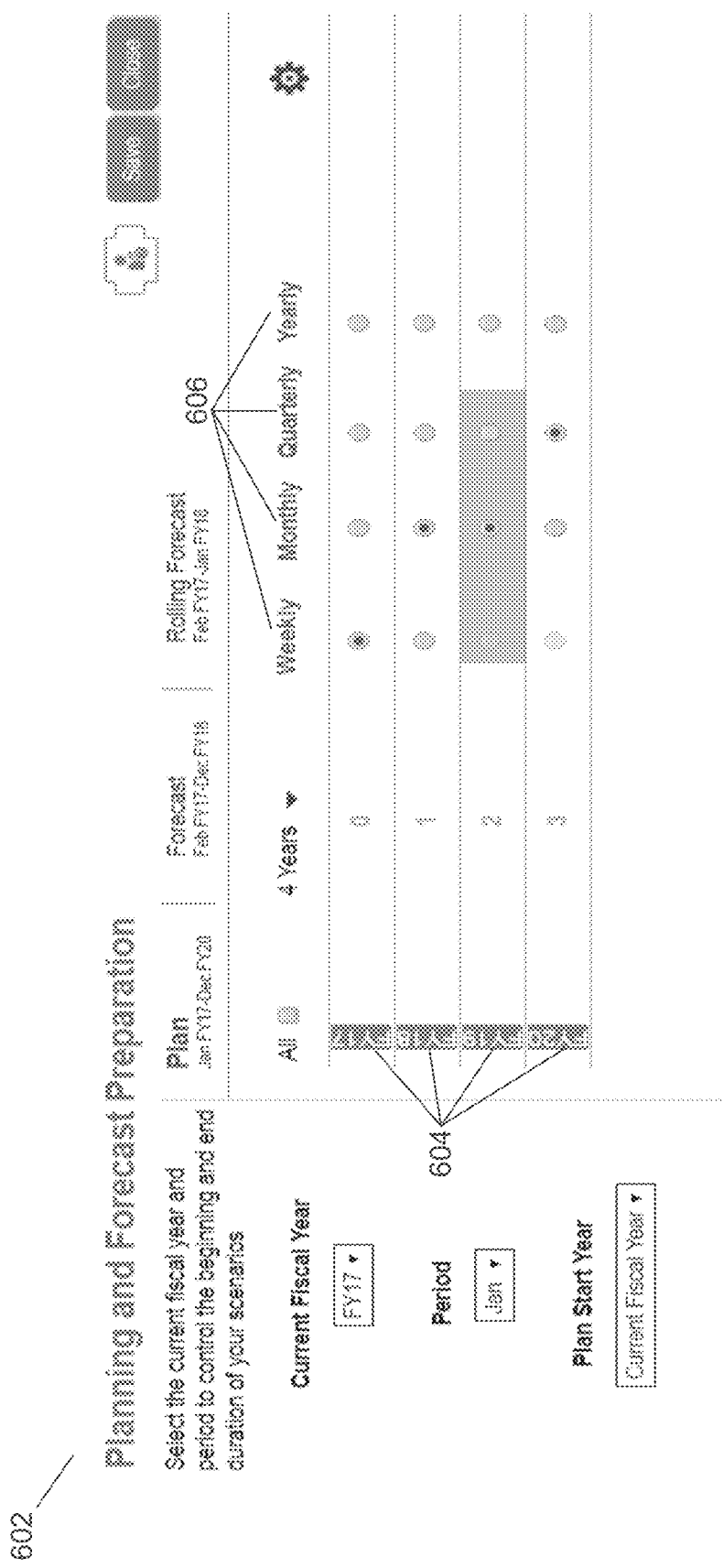
FIG. 6 illustrates another example graphical user interface for configuring data granularities according to an example embodiment.

FIG. 5B illustrates an example implementation of a period dimension with a weekly configuration according to an example embodiment. For example, a scenario where weekly granularity is enabled can include a default weekly logical structure within the data model that includes 52 or 53 week members. Period dimension 510 shows a number of logical structures, such as a yearly plan, quarterly plan, and weekly plan 512.

In some embodiments, when a user indicates a business process (member of accounts, entity, and the like) is performed at a weekly level, the corresponding period dimension can be seeded with 52/53 weekly members as indicated below. These weekly members can be enabled for the business process (and cubes) for which weekly planning is enabled. In some examples, either all weekly members are enabled for a plan type or none of them can be enabled. Other examples can include other implementations that allow partially enabling weekly members.

As mentioned above, the customer can choose different granularity of planning for different years e.g. current year can be planned at weekly level while year 2 at monthly level, year 3 at quarterly level and year 4 onwards at yearly level. The weeks to months and months to weeks conversion rules can ensure the weeks and months values are aligned as per the configurations and the months show the appropriate aggregate values from the weeks (based on the time balance property of accounts) and similarly the monthly values are appropriately allocated to weeks. The user has flexibility to plan at weekly level but also review the values at a monthly level. Similarly, the user can plan at a monthly level and allocate the value to weeks With reference to FIG. 6, planning granularities can be selected for various data elements, such as combinations for members of scenarios, years, and other suitable dimensions. In some embodiments, example combinations or cross-sections of data include a planning scenario for entity 1 over year 2018 that is planned at a weekly granularity, a forecasting scenario for entity 2 over year 2019 that is forecasted at a monthly granularity, and the like. In some embodiments, users can control a planning granularity by multiple dimensions and configure weekly planning by any number of dimensions (Scenario, Year, Entity, Accounts, and the like). For example, 2017 can be planned at weekly granularity and forecast at monthly granularity, or for entity 1 expenses can be planned weekly while for entity 2 expenses can be planned monthly and revenue can be planned weekly.

This dynamic planning granularity selection allows for planning at a business model level rather than an application level. An application can be made up of multiple cubes catering to different planning attributes (e.g., Financial, Workforce, Projects, Capital, and the like). Weekly planning may or may not apply to all of the business processes and/or cubes in the application. Users can indicate if financials are planned by week whereas for capital, the lowest level of granularity might be monthly. In some embodiments, weekly planning for a given data element does not require weekly planning for all cubes. For example, a user can enable weekly planning for one or more cubes (e.g., Plan 1, Plan 2, Plan 3).

User interface 602 illustrates a planning scenario where the current fiscal year is depicted as 2017. Years 604 represents the years 2017, 2018, 2019, and 2020, while periods 606 represent weekly, monthly quarterly, and yearly granularities. For each of years 604, a period 606 can be selected as a default planning granularity. In the illustrated example, 2017 is planned at a weekly period, 2018 is planned at a monthly period, 2019 is planned at a monthly period, and 2020 is planned at a quarterly period. In some embodiments, a given year (e.g., 2017) can include multiple planning granularities, such as weekly for a first quarter, monthly for a second quarter, and quarterly for the remaining two quarters.

As will be further illustrated, the period dimension in combination with a given year and a given scenario can define planning granularity at a default level, however individual data elements (e.g., members of a dimension or combinations of members of multiple dimensions), such as descendants of entity 1, can be have varying granularities (e.g., for different accounts) over the given year and scenario.

Figure 7:
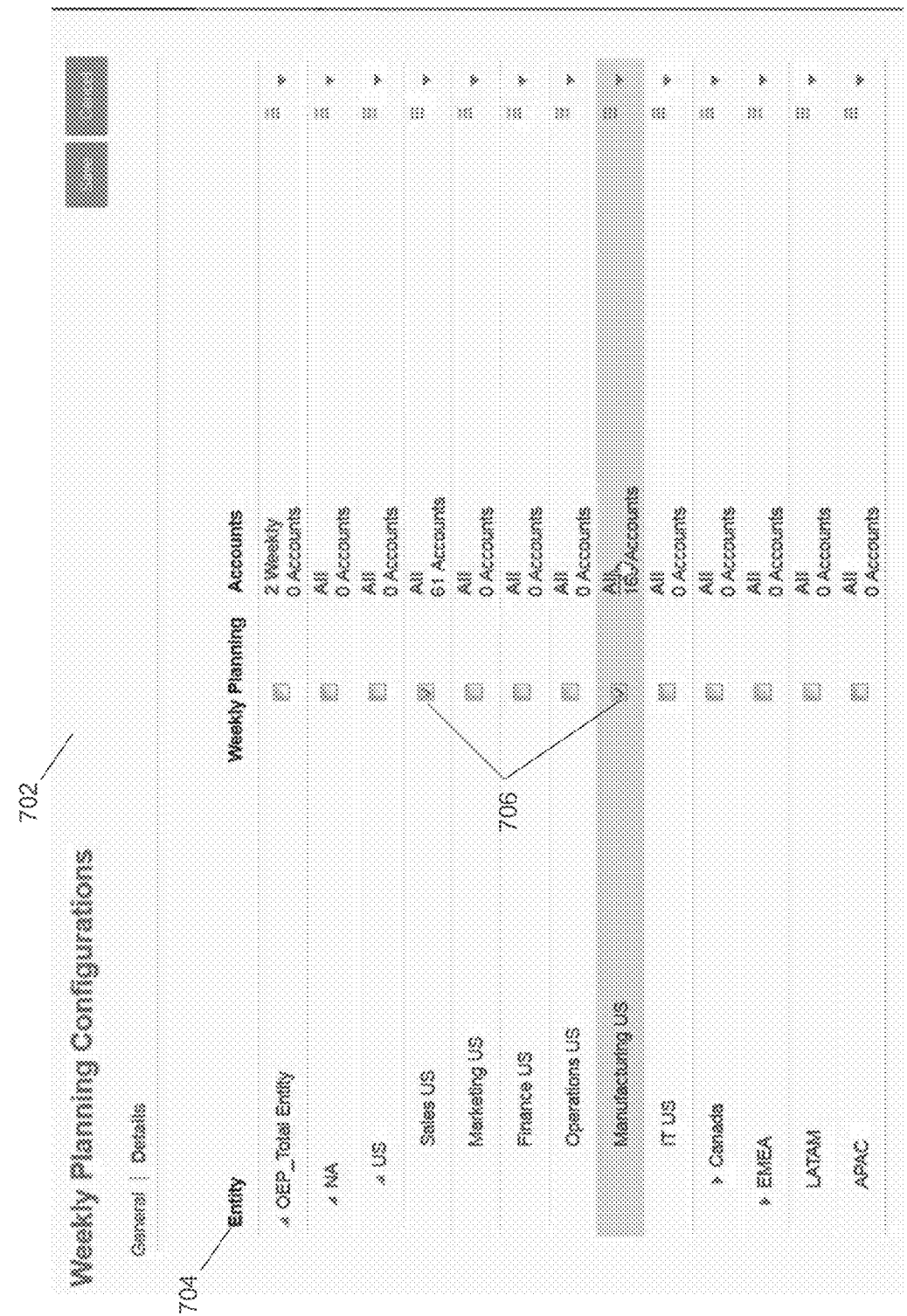
FIG. 7 illustrates an example graphical user interface for configuring a weekly data granularity in a hierarchical multi-dimensional data model according to an example embodiment.

With reference to FIG. 7, graphical user interface 702 illustrates an interface for configuring weekly planning for members of dimension 704, which is Entity in the illustrated example. The members of dimension 704 illustrate a hierarchical structure, where a parent node (e.g., US) includes a number of child nodes, descendants, or members (e.g., Sales US, Marketing US, Finance US, Operations US, Manufacturing US, IT US). As illustrated, separate data elements within the hierarchy of data elements in the entity dimension can be selected for a granularity that is different from the default granularity. In the illustrated example, Sales US and Manufacturing US are selected for a weekly planning granularity using user interface elements 706 while the remaining data elements are configured with the default granularity (e.g., monthly or weekly).

For various organizations, weekly level planning is often used for a subset of the account structures. For example, in retail weekly planning may be prepared for sales and margin. For operational models, weekly planning may be for the business drivers and not for all accounts. In some embodiments, a level of detail per account group can be further configured. For example, in financials, weekly planning could be for product revenue and not for support revenue or other revenue. The level of granularity can also vary by Entity (e.g., some entities may want to plan product revenue at weekly level while other entities may plan at a monthly level). The presented embodiments allow for a data model with dynamic granularity that is a natural extension of such real-world circumstances.

In some embodiments, once granularities have been selected for the various dimensions and/or data elements within the various hierarchical dimension, selections can be received from users to display cross-sections of the multi-dimensional data. For example, embodiments of display forms can include the weekly members defined in the period dimension. Weeks can be placed for the Account grouping for which weekly planning is enabled. For the Account groupings that are not planned at a weekly level the display forms can be configured with monthly/quarterly/yearly members. In some embodiments, dashboards can place the weekly members properly to facilitate analysis and reporting. As further detailed herein, conversion calculations associated with forms are provided to move the data from week members to the corresponding months and vice a versa.

Figure 8:
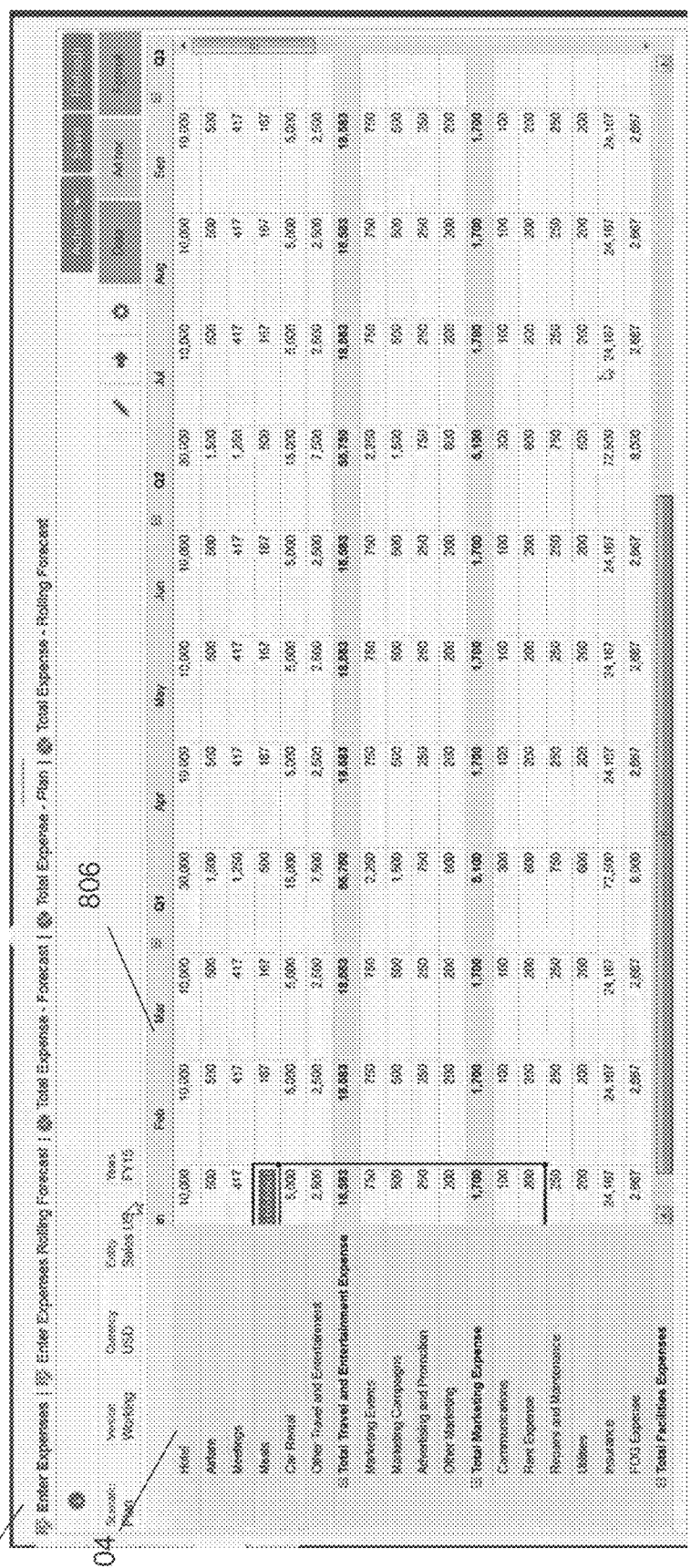
FIG. 8 illustrates an example graphical user interface that displays mixed data granularities according to an example embodiment.

With reference to FIG. 8, graphical user interface 802 illustrates a display of a cross-section of a multi-dimensional hierarchical data model. The illustrated example represent a cross-section of expenses (e.g., a member of the Accounts dimension) for the plan Scenario over year 2015 and for the entity sales US. For example, different data elements (or child nodes, descendants, or members) of expenses for US sales are listed at user interface element 804. The planned expense data for US sales over year 2015 is displayed in grid 806, which is configured in a monthly setting.

In some embodiments, the monthly display configuration illustrated in FIG. 8 can be based on one or more driver dimensions for the selected cross-section of data. A dimension can be considered a driver dimension when it is a required dimension in a selected cross-section of data and to indicate that configuration information for the driver dimension are a reference point when configuring the selected cross-section of data (e.g., configuring the display of the cross-section). In the illustrated example, Entity (e.g., sales US) can be identified as a driver dimension for the selected cross-section, and the monthly display configuration can be based on a monthly granularity for this member of the Entity dimension.

Figure 9:
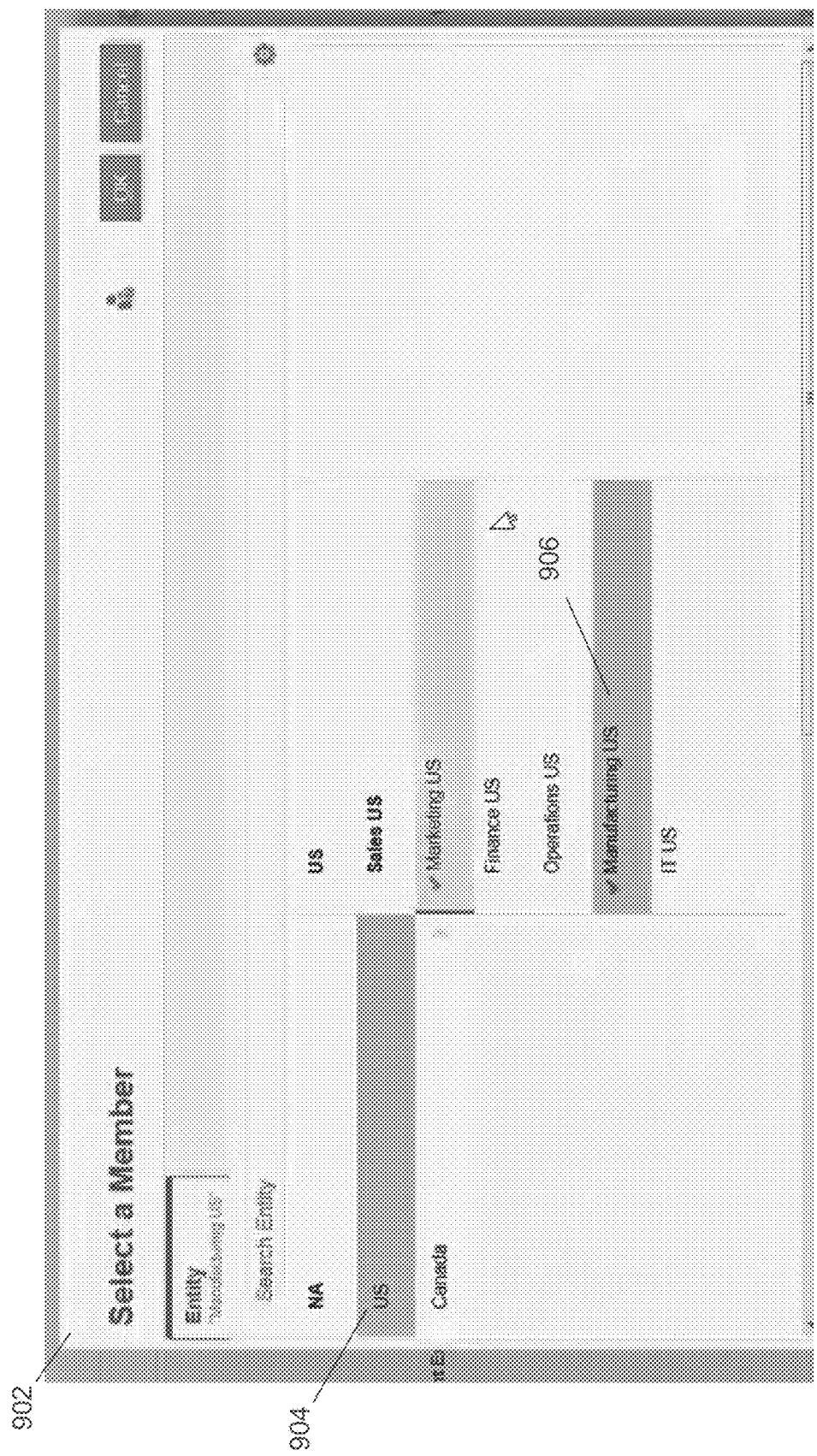
FIG. 9 illustrates an example graphical user interface for receiving a selection of data for display according to an example embodiment.

In some embodiments, the member of the Entity dimension displayed can be changed based on a new selection. With reference to FIG. 9, graphical user interface 902 illustrates a user interface for selecting a cross-section of data in the multi-dimensional data model. The illustrated example depicts a member of the Entity dimension US 904 and descendants of that member. Manufacturing US 906, a new member of US 904, is selected for display.

Figure 10:
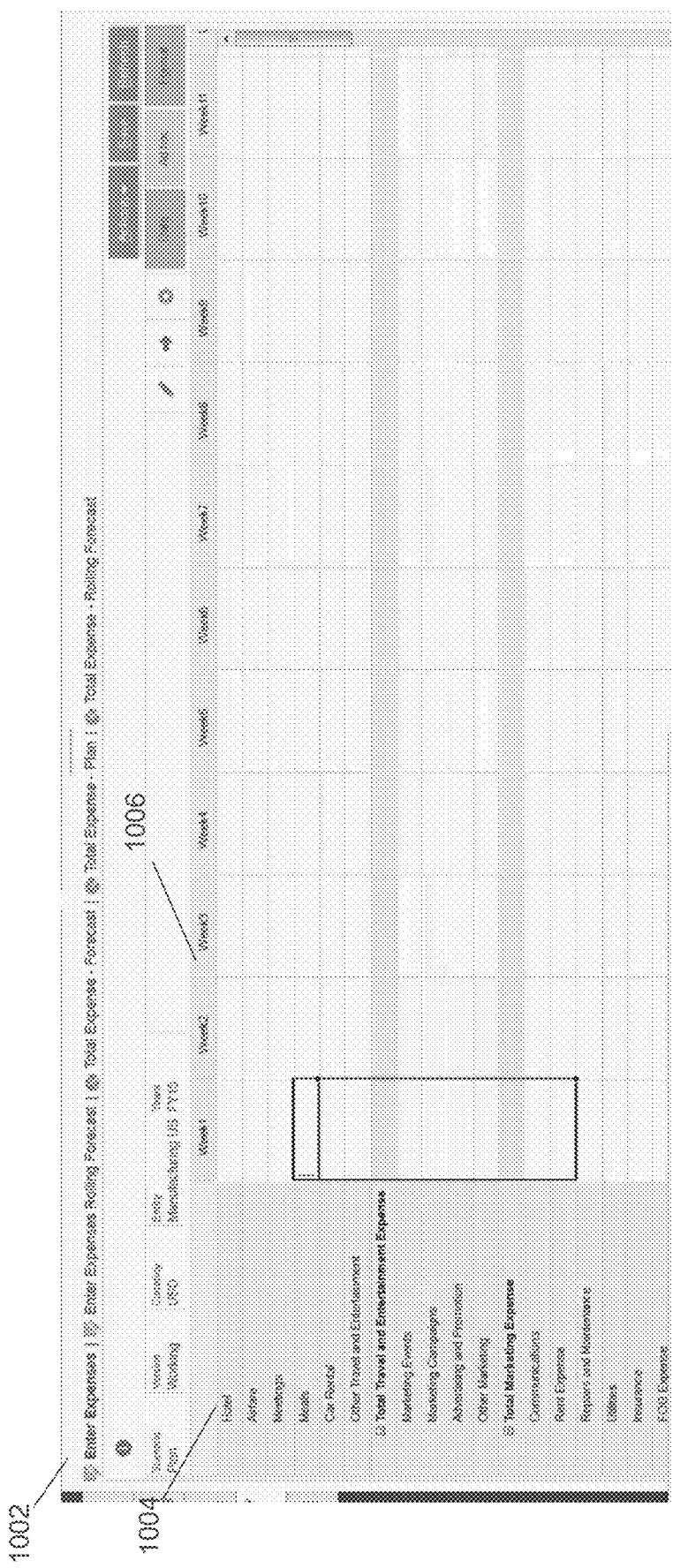
FIG. 10 illustrates another example graphical user interface that displays mixed data granularities according to an example embodiment.

With reference to FIG. 10, graphical user interface 1002 illustrates a display of a cross-section of a multi-dimensional hierarchical data model according to the selections from FIG. 9. The illustrated example represent a cross-section of expenses for the plan Scenario over year 2015 and for the Entity manufacturing US. For example, different data elements (or child nodes, descendants, or members) of expenses for manufacturing are listed at user interface element 1004. In contrast to FIG. 8, grid 1006 is displayed in a weekly configuration rather than a monthly configuration based at least in part on the new selection of manufacturing US.

In some embodiments, selected cross-sections of data may not have the same granularity. For example, entity 1 of the Entity dimension can have members entity 1-1 and entity 1-2. For a given year entity 1-1 can be planned weekly while entity 1-2 is planned monthly. A request to display a cross-section of data that includes this plan for entity 1-1 and entity 1-2 can result in an incompatibility. Embodiments perform conversation calculations on the planned data for one of entity 1-1 or entity 1-2 to map the data from one granularity to the other (e.g., weekly to monthly or monthly to weekly. As a result, the cross-section of data can be displayed in a manner similar to FIGS. 8 and 10 (e.g., in a weekly setting even though some underlying data is not at a weekly granularity or in a monthly setting even though some underlying data is not at a monthly granularity). In some embodiments, display forms can have spreading/shrinking functionality or spreading/shrinking logic to spread monthly data into a weekly display configuration or to shrink weekly data into a monthly display configuration. In some embodiments, the spreading/shrinking logic can be provided at another layer of the application (e.g., business logic layer).

In some embodiments, a rolling forecast scenario can be provided that allows a user to select a number of rolling weeks for a forecast. For example, a rolling forecast can including 13, 26, 52, or any other suitable number of rolling weeks. Data entry forms provide forms for configuring the rolling forecast when it is enabled. Either valid combinations or sub-variables can be leveraged to manage the number of weeks available for a rolling forecast. For example, a rolling forecast can have the following sub-variables for managing the rolling weeks:

| Weekly SubVars | Explaination | Example |
| --- | --- | --- |
| OEP_WeeklyPlanRange | Used to define the Year Range for Scenario - Plan that is performed at the Weekly Level | FY17:FY18 |
| OEP_WeeklyRFRange | Used to define the Year Range for Scenario - Forecast that is performed at the Weekly Level | FY16 |
| OEP_WeeklyFCSTRange | Used to define the Year Range for Scenario - Rolling Forecast that is performed at the Weekly Level | FY16:FY17 |

| Weekly SubVars | Explanation | Example |
|---|---|---|
| OEP_ActWeeks | Used to define the Weeks that should be displayed on a form for Rolling forecast from Actuals | Week20:Week27 |
| OEP_WeeklyRange | Used to define the Weeks that should be displayed on a form for Rolling forecast form for the First Year of Rolling Forecast that is the Current Year. These are the future periods | Week28:Week52 |
| OEP_WeeklyYr2Range | Used to define the Weeks that should be displayed on a form for Rolling forecast form for the 2nd Year of Rolling Forecast that is the Current Year. These are the future periods | Week1:Week27 |

In some embodiments, allowing cross-sections of data with mixed granularities to be selected for processing or display includes management of the invalid data combinations that can occur based on the selected the cross-section. Embodiments generate rules for valid combinations based on a selected cross-section of data and identified anchor dimensions for the selection. Valid combinations provide the defining of rules, or valid combination rules, which can filter certain intersections of data when performing data combinations. Valid combination groups define dimensions to be included in a selection where one or more of those dimensions are identified as anchor dimensions. Non-anchor dimensions can be identified as required in a selection or not required. A selection can also define whether the anchor dimension members not specified or referenced will be valid or invalid.

In some embodiments, the selection of the cross-section of data can be received from a user and may represent a custom cube of data to be displayed to the user. For example, a user can define specific data elements (or specific members of a plurality of dimensions) and the system can generate a custom view of the cross-section of data. Accordingly, the valid combination rules allow for efficient manipulation of the multi-dimensional data model.

In embodiments, anchor dimensions are required dimensions in a cube that is used in the valid combination evaluation. In embodiments, if a non-anchor dimension is required, a cube that does not use that non-anchor dimension can ignore the valid combination group where that non-anchor dimension is tagged as required as it evaluates the valid combinations. In embodiments, if a non-anchor dimension is not required, a cube that does not use that non-anchor dimension can still evaluate any valid combination group that includes that non-anchor dimension as not required and evaluate the combinations of any other dimensions in the valid combination group in use in the cube. In some embodiments, anchor dimension members that are not explicitly configured are valid by default, but can be marked invalid.

FIG. 11 illustrates an example flow diagram for determining valid data combinations according to an example embodiment. In one embodiment, the functionality of FIGS. 11 and 12 below is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 1102, configurations for a selected cross-section of data can be read. For example, selections for a cross-section of data from the multi-dimensional data model can be received. The selections can include members of various dimensions of data (e.g., entity 1-1, account 1, year 2018, scenario plan, and the like). The configuration information for the selections can be read, such as the granularity for the selected members of the dimensions and any combination specific granularities.

At 1104, member selections that participate in separate valid combination rules are identified. For example, member selections within the selected cross-section of data, such as entity 1-1, a member of the Entity dimensions and entity 1, are processed to identify which of the member selections will be included in separate valid combinations rules. In one example, entity 1 participates in valid combination rules when, for the selected cross-section of data, when one of its descendants has a first granularity (e.g., weekly) while a second descendant has a second granularity (e.g., monthly).

In some embodiments, a given member of a dimension can have a default granularity (e.g., monthly), yet a combination specific granularity different from the default granularity (e.g., weekly) can be received that includes the given member. For example, an entity 1-1 can have a default granularity of monthly, however a combination specific granularity of weekly for combinations of entity 1-1 and account 1-1 can be received. When the selected cross-section of data includes a combination of entity 1-1 and account 1-1, the combination specific granularity takes priority over the default granularity. Members selections can be identified as participating in separate valid combination rules when such a discrepancy between default granularity and combination specific granularity exists. The identified member selections can be added to an exclusion list in some embodiments.

At 1106, a for loop can be initiated that loops through the member selections identified at step 1104. At 1108, it can be determined whether the given member selection (being processed within a loop of the for loop) is excluded from a default granularity (e.g., weekly granularity). When the given member selection is not excluded, the functionality can move to 1110. When the given member selection is excluded, the functionality can move to 1112.

At 1110, the given member selection can be added to weekly granularity. In addition, an inverse selection can be added to monthly granularity to ensure that the selected cross-section of data does not result in retrieval of an invalid combination when performing data retrieval according to the selection. At 1112, the given member selection can be added to weekly granularity.

At 1114, it is determined whether more member selections are available to process. For example, 1114 loops back to 1106 until the for loop has iterated over each of the member selections identified in step 1104. Once the for loop has exhausted the identified member selections, valid combination rules are generated at 1116. These valid combination rules are based on the member selections that are added to weekly granularity, the inverse member selections that are added to monthly granularity, and the remaining member selections that are added to monthly granularity by the for loop. Pseudocode for generating the valid combination rules and example data structures generated by performing the pseudocode are further detailed herein.

The example pseudocode can be configured to process any suitable selections of data. In the example detailed herein, the multi-dimensional data model includes dimensions Entity, Account, Scenario, Year, and Period. Combinations that include a given scenario and a year period are set as valid. In some examples, weekly and monthly periods have both weekly and monthly granularities enabled, for example as planning granularities.

In some embodiments, for each scenario, year, and period combination that is weekly or monthly, valid combinations rules are generated. By default, combinations of dimensions involved are considered valid for weekly and monthly periods for the scenarios defined. Based on the members excluded for each dimension, various valid combination rules are added to filter invalid combinations. In some implementations, the exclusion principle is leveraged, that is, instead of identifying what is valid, invalid combinations are identified. The pseudocode below illustrates a sample algorithm for generating a data structure that stores a plurality of valid combination rules:

---

Data Structures

MemberSelection:
— MemberMapping[ ] mappings
  // Contains an array of Member Mapping object
MemberMapping
— memberName
  // Name of member
— dimensionName
  //Name of dimension
— Function
  //Example: Children, Descendants
— isExcluded
  //Set to true if member mapping is to be excluded.
  //Default is false & will indicate inclusion.
ValidCombination
— List<Dimension>
  //List of dimension names involved
— List<Rule>
  // List of rule
— MemberSelection
  //Each rule is a member selection
Parameters ○ Period dimension members define the granularity of Planning. Descendants(Weekly) indicate weekly planning, Descendants(YearTotal) indicate monthly planning.
○ The platform provides the ability to define valid combinations & allows process/display of the valid combinations.

Input

List<String> driverDimensions
List<MemberSelection> weeklyConfigurations
Algorithm/ pseudocode

```
def List<MemberMapping> exclusionListForBaseDriver;
//Stores the base driver dimension on which granularity is defined.
def List<Rule> validCombinations;
//Is the output valid combination
def numDimensions = driverDimensions.length;
//Number of dimensions participating in deriving the granularity
   for each memberselection in weeklyConfiguration{
       def MemberSelection currSelection = memberSelection;
       //Assign to a temp variable
       for each memberMapping in currSelection.mappings{
           if (firstElement){
exclusionListForBaseDriver.add(memberMapping);
//For every member selection of base dimension for which a rule will be created
needs to be excluded from the default rule.
           }
```

```
           if(is next mapping available){
//There is a subset of succeeding driver dimensions available. Do nothing.
               continue;
           }else{
               if( index == numDimensions){
//The member selection for last driver dimension.
                   for( i = numDimensions; i > 0 ; i--){
//A rule is added for dimension member mappings looping for over the dimensions.
create new rule & add to the valid combination list
for (j=0; j < mappings.length; j++){
    if( j < i){
        add memberMapping to the rule
        continue;
    }
    if(j < numDimensions){
        if(j == i){
            add memberMapping[j] to rule.
            set excluded to true;
        }else{
            add allMembersOfDimMapping to rule.
        }
    }
}
if(i == numDimension){
    add weeklyMapping to the rule.
        }else{
    add monthlyMapping to the rule.
        }
}
           }else{
               create new rule & add to the valid combination list
               add all member mappings processed so far to the rule.
For rest of the pending dimensions, add allMembersOfDimMapping to rule.
add monthlyMapping to the rule.
           }
       }
   }
}
create new rule & add to the valid combination list
Add addMembersOfDimMapping for every dimension.
For the first driver dim, add exclusionListForBaseDriver & set isExcluded to true.
OUTPUT
```

List<Rule> validCombinations;

---

Disclosed is an example of a sample input, sample generation of the rules data structures based on the above pseudocode code, and sample output of valid combination rules. The sample provides valid combination rules that are generated based on a subset of dimensions, namely Scenario, Year, Entity and Account. In this case, weekly planning is the default for 2018 and the plan Scenario. The following three members of the Entity dimension include combination specific granularities: Sales US—Revenue (a member of Account) planning has a weekly granularity while other combinations have a monthly granularity; Manufacturing US—Expense (a member of Account) Planning has a weekly granularity while other combinations have a monthly granularity; and Finance US—combinations have a monthly granularity.

Input
Member Selections: [{mappings: mbrName: "SalesUS",dimension: "Entity",function: "Descendants"}, {mbrName: "RevenuePlanning",dimension: "Account",function: "Descendants"}]}, {mappings: [{mbrName: "ManufacturingUS",dimension: "Entity",function: "Descendants"}, {mbrName: "ExpensePlanning",dimension: "Account", function: "Descendants"}]}, {mappings: [{mbrName: "Finance US",dimension: "Entity",function: "Descendants"}]}]
Driver dimensions: ["Entity","Account"]

Generation of Rules:
After Processing 1st Element in memSelection:
After processing 1st mapping: exclusionListForBaseDriver: [{mbrName: "Sales US",dimension: "Entity",function: "Descendants"}]
After processing 2nd mapping: Rules: [[{mbrName: "Sales US",dimension: "Entity",function: "Descendants"},{mbrName: "RevenuePlanning",dimension: "Account",function: "Descendants"}, {mbrName: "Weekly",dimension: "Period",function: "Descendants"}], [{mbrName: "Sales US", dimension: "Entity",function: "Descendants"}, {mbrName: "RevenuePlanning",dimension: "Account",function: "Descendants","isExcluded": true},{mbr Name: "Monthly",dimension: "Period",function: "Descendants"}]]
/* At this time, the algorithm adds 2 rules based on first member selection. The first rule is setting the Entity/Account combination to Weekly. When this is defined, the invalid combinations for particular granularities are also defined. Hence the accounts that are included in the first rule are excluded & monthly granularity for those selections are made valid for that Entity. */
After Processing 2nd Element in memSelection:
After processing 1st mapping: exclusionListForBaseDriver: [{mbrName: "Sales US",dimension: "Entity",function: "Descendants"}, {mbrName: "Manufacturing US",dimension: "Entity",function: "Descendants"}]
After processing 2nd mapping: Rules: [[{mbrName: "Sales US",dimension: "Entity",function: "Descendants"},{mbrName: "RevenuePlanning",dimension: "Account",function: "Descendants"}, {mbrName: "Weekly",dimension: "Period",function: "Descendants"}], [{mbrName: "Sales US", dimension: "Entity",function: "Descendants"}, {mbrName: "RevenuePlanning",dimension: "Account",function: "Descendants","isExcluded": true},{mbrName: "Monthly", dimension: "Period",function: "Descendants"}], [{mbrName: "ManufacturingUS",dimension: "Entity",function: "Descendants",}, {mbrName: "ExpensePlanning",dimension: "Account",function: "Descendants"},{mbrName: "Weekly",dimension: "Period",function: "Descendants"}], [{mbrName: "Manufacturing US",dimension: "Entity", function: "Descendants"}, {mbrName: "ExpensePlanning", dimension: "Account",function: "Descendants","isExcluded": true},{mbrName: "Monthly",dimension: "Period", function: "Descendants"}]]
/* In this iteration, additional 2 rules are added based on the member selection.*/
After Processing 3rd Element in memSelection:
After processing 1st mapping: exclusionListForBaseDriver: [{mbrName: "Sales US",dimension: "Entity",function: "Descendants"}, {mbrName: "Manufacturing US",dimension: "Entity",function: "Descendants"}, {mbrName: "Finance US",dimension: "Entity",function: "Descendants"}]
After processing 2nd mapping: Rules: [[{mbrName: "SalesUS",dimension: "Entity",function: "Descendants"}, {mbrName: "RevenuePlanning",dimension: "Account",function: "Descendants"}, {mbrName: "Weekly",dimension: "Period",function: "Descendants"}], [{mbrName: "SalesUS",dimension: "Entity",function: "Descendants"},{mbrName: "RevenuePlanning",dimension: "Account",function: "Descendants","isExcluded": true}, {mbrName: "Monthly",dimension: "Period",function: "Descendants"}], [{mbrName: "ManufacturingUS",dimension: "Entity",function: "Descendants"},{mbrName: "ExpensePlanning",dimension: "Account",function: "Descendants"},{mbrName: "Weekly",dimension: "Period",function: "Descendants"}], [{mbrName: "ManufacturingUS",dimension: "Entity",function: "Descendants"},{mbrName: "ExpensePlanning",dimension: "Account",function: "Descendants","isExcluded": true}, {mbrName: "Monthly",dimension: "Period",function: "Descendants"}], [{mbrName: "FinanceUS",dimension: "Entity",function: "Descendants"},{mbrName: "Account",dimenson: "Account",function: "Descendants"}, {mbrName: "Monthly",dimension: "Period",function: "Descendants"}]]
/* Here since there was no mapping for Account dimension, all members of Account dimension which is represented as Descendants(Account) are set to be valid for monthly granularity*/
After Processing all Member Selections:
Rules: [[{mbrName: "Sales US",dimension: "Entity",function: "Descendants"},{mbrName: "RevenuePlanning",dimension: "Account",function: "Descendants"}, {mbrName: "Weekly",dimension: "Period",function: "Descendants"}], [{mbrName: "SalesUS",dimension: "Entity",function: "Descendants"}, {mbrName: "RevenuePlanning",dimension: "Account",function: "Descendants","isExcluded": true}, {mbrName: "Monthly",dimension: "Period",function: "Descendants"}], [{mbrName: "ManufacturingUS", dimension: "Entity",function: "Descendants"},{mbrName: "ExpensePlanning",dimension: "Account",function: "Descendants"},{mbrName: "Weekly",dimension: "Period",function: "Descendants"}], [{mbrName: "ManufacturingUS",dimension: "Entity",function: "Descendants"},{mbrName: "ExpensePlanning",dimension: "Account",function: "Descendants","isExcluded": true}, {mbrName: "Monthly",dimension: "Period",function: "Descendants"}], [{mbrName: "FinanceUS",dimension: "Entity",function: "Descendants"},{mbrName: "Account", dimension: "Account",function: "Descendants",}, {mbrName: "Monthly",dimension: "Period",function: "Descendants"}], [{mbrName: "Entity",dimension: "Entity", function: "Descendants"}, {mbrName: "Sales US", dimension: "Entity",function: "Descendants","isExcluded": true}, {mbrName: "Manufacturing US",dimension: "Entity",function: "Descendants","isExcluded": true}, {mbrName: "Finance US",dimension: "Entity",function: "Descendants","isExcluded": true}, {mbrName: "Account", dimension: "Account",function: "Descendants"}, {mbrName: "Weekly",dimension: "Period",function: "Descendants"}]]
/*At the end, the assumption that all combinations are valid for weekly granularity is added. Here since specific combinations for certain member selections are defined for the base dimension, those base dimension member selection are excluded so the specific rules get applied for them */
Another representation of the valid combinations rules generated by the sample algorithm is:

| Scenario | Entity | Years | Period | Account | Plan Element |
|---|---|---|---|---|---|
| OEP_Plan | Descendants (Entity), Exclude (Finance US, Sales US, Manufacturing US) | FY15 | BegBalance, IDescendants (OEP_Weekly Plan) | Descendants (Account) | Descendants (Plan Element) |

-continued

| Scenario | Entity | Years | Period | Account | Plan Element |
|---|---|---|---|---|---|
| OEP_Plan | Finance US | FY15 | BegBalance, IDescendants (YearTotal) | Descendants (Account) | Descendants (Plan Element) |
| OEP_Plan | Sales US | FY15 | BegBalance, IDescendants (OEP_Weekly Plan) | IDescendants (OFS_Revenue Planning), Exclude (OFS_Bad Debt) | Descendants (Plan Element) |
| OEP_Plan | Sales US | FY15 | BegBalance, IDescendants (YearTotal) | Descendants (Account), Exclude (IDescendants (OFS_Revenue Planning)) | Descendants (Plan Element) |
| OEP_Plan | Descendants (Entity) | FY16 | BegBalance, IDescendants (YearTotal) | Descendants (Account) | Descendants (Plan Element) |
| OEP_Plan | Descendants (Entity) | FY17 | BegBalance, IDescendants (YearTotal) | Descendants (Account) | Descendants (Plan Element) |
| OEP_Plan | Manufacturing US | FY15 | BegBalance, IDescendants (OEP_Weekly Plan) | Descendants (OFS_Expense Planning) | Descendants (Plan Element) |
| OEP_Plan | Manufacturing US | FY15 | BegBalance, IDescendants (YearTotal) | Descendants (Account), Exclude (IDescendants (OFS_Expense Planning)) | Descendants (Plan Element) |

This illustrated example demonstrates a sample selection of a cross-section of data including four dimensions (two of which are driver dimensions), selected granularities that include a mix of monthly and weekly granularities, an example algorithm for processing the individual members of the dimensions, and a generated data structure with a plurality of valid combination rules to be used when performing data combinations based on the selected cross-section of data.

In some embodiments, data is retrieved from a database according to the selection and based on the valid combination rules. The combinations indicated as invalid by the plurality of rules are filtered from the retrieval. For example, a selection may include all members of the Period dimension, where for a given combination of data (e.g., given scenario, entity, year, and the like) weekly data is valid and monthly data is invalid. The monthly data can be filtered (e.g., removed) from the retrieved data before returning the results, thus ensuring that the invalid data combination is not further used (e.g., is not displayed to a user). In some embodiments, a similar example may occur where, for the given combination, weekly data is valid and all other data for other period members (e.g., monthly, quarterly, yearly, and the like) is invalid. In this instance, data for all the other period members can be filtered (e.g., removed) from the retrieved data before returning the results. In some embodiments, filtration of the invalid combinations occurs after the data is retrieved from a database (e.g., is a post-query processing/filtration technique).

These valid combination rules enable a multi-dimensional hierarchical data model to include individual combinations of dimensional data with differing granularities to be manipulated, processed, formatted, and displayed on a user interface. The data retrieved for the selection can be display in one or more forms that format the data. In some examples, conversion calculations can be used to display data with different granularities together. Example conversion calculations include weeks to months mappings and months to weeks mappings.

A conversion from weeks to months can depend on time balance & skip value properties of an account. Considering option=445 & first month=January:

| Time Balance property | Skip Value | Value at month level | Example |
|---|---|---|---|
| Flow/Fill | None | Aggregated week values in month. | Jan = W1 + W2 + W3 + W4, Feb = W5 + W6 + W7 + W8, Mar = W9 + W10 + W11 + W12 + W13 |
| Fill | Zeros/ Missing & Zeros | Aggregated week values (non-zero) in month. | W1 = 0, W2 = 0, W3 = 0, W4 = 0, Jan = #missing |
| First | None | First week value in month. | Jan = W1, Feb = W5, Mar = W9 |
| First | Missing | First non-missing week in month. | W1 = #missing, W2 = #missing, W3 = 100, W4 = 0, W5 = #missing, W6 = 0, W7 = #missing, W8 = 100, W9 = #missing, W10 = 100, W11 = #missing, W12 = #missing, W13 = 100, Jan = W3 = 100, Feb = W6 = 0, Mar = W10 = 100 |
| First | Zeroes | First non-zero week value in month. | W1 = #missing, W2 = #missing, W3 = 100, W4 = 0, W5 = #missing, W6 = 0, W7 = #missing, W8 = 100, W9 = #missing, W10 = 100, W11 = #missing, W12 = #missing, W13 = 100, Jan = W3 = 100, Feb = W8 = 100, Mar = W10 = 100 |

-continued

| Time Balance property | Skip Value | Value at month level | Example |
|---|---|---|---|
| First | Missing & Zeroes | First non-missing and non-zero value in month. | W1 = #missing, W2 = 0, W3 = 100, W4 = 0, W5 = #missing, W6 = 0, W7 = #missing, W8 = 100, W9 = #missing, W10 = 100, W11 = #missing, W12 = #missing, W13 = 100 <br> Jan = W3 = 100, Feb = W8 = 100, Mar = W10 = 100 |
| Balance | None | Last week value in month. | Jan = W4, Feb = W8, Mar = W13 |
| Balance | Missing | Last week having data in month. | W1 = 100, W2 = #missing, W3 = 100, W4 = #missing, W5 = 100, W6 = #missing, W7 = #missing, W8 = 100, W9 = #missing, W10 = 100, W11 = 100, W12 = #missing, W13 = #missing <br> Jan = W3 = 100, Feb = W8 = 100, Mar = W11 = 100 |
| Balance | Zeros | Last non zero value in month. | W1 = 100, W2 = #missing, W3 = 100, W4 = 0, W5 = 100, W6 = 0, W7 = #missing <br> W8 = 100, W9 = 0, W10 = 100, W11 = #missing, W12 = #missing, W13 = 0 <br> Jan = W3 = 100, Feb = W8 = 100, Mar = W10 = 100 |
| Balance | Missing & zeroes | Last non-missing and non-zero value in month. | W1 = 100, W2 = 100, Wk3 = #missing, W4 = 0, W5 = 100, W6 = 0, W7 = #missing, W8 = 100, W9 = 0, W10 = 100, W11 = #missing, W12 = 100, W13 = #missing <br> Jan = W2 = 100, Feb = W8 = 100, Mar = W12 = 100 |
| Average | None | Average of weeks in month. | Jan = W1 + W2 + W3 + W4/4 <br> Feb = W5 + W6 + W7 + W8/4 <br> Mar = W9 + W10 + W11 + W12 + W13/5 |
| Average | Missing | Average of weeks having data in month. | W1 = 100, W2 = #missing, W3 = 100, W4 = #missing, W5 = 100, W6 = #missing, W7 = #missing, W8 = 100, W9 = #missing, W10 = 100, W11 = #missing, W12 = #missing, W13 = 100 <br> Jan = (100 + 100)/2 = 100, Feb = (100 + 100)/2 = 100, Mar = (100 + 100 + 100)/3 = 100 |
| Average | Zeros | Average of non-zero week values in month. | W1 = 100, W2 = #missing, W3 = 100, W4 = 0, W5 = 100, W6 = 0, W7 = #missing, W8 = 100, W9 = 0, W10 = 100, W11 = #missing, W12 = #missing, W13 = 100 <br> Jan = (100 + 100)/3 = 66.67, Feb = (100 + 100)/3 = 66.67, Mar = (100 + 100 + 100)/3 = 66.7 |
| Average | Missing & Zeros | Average of week values having non-zero data in month. | W1 = 100, W2 = #missing, W3 = 100, W4 = 0, W5 = 100, W6 = 0, W7 = #missing, W8 = 100, W9 = 0, W10 = 100, W11 = 0, W12 = #missing, W13 = 100 <br> Jan = (100 + 100)/2 = 100, Feb = (100 + 100)/2 = 100, Mar = (100 + 100 + 100)/3 = 100 |

Example options for months to weeks mappings according to various embodiments are:

| Time Balance property | Skip Value | Value at week level | Example |
|---|---|---|---|
| Flow | None | Month value divided by no of weeks in month | Jan = 100, Feb = 100, Mar = 100 <br> W1 to W4 = 100/4 = 25, W5 to W8 = 100/4 = 25, Wk9 to Wk13 = 100/5 = 20 |
| First/Fill/Balance/Average | None | Same as in month | Jan = 100, Feb = 100, Mar = 100 <br> W1 to W4 = 100, W5 to W8 = 100, Wk9 to Wk13 = 100 |
| First/Fill/Balance/Average | Zeroes/ Missing & Zeroes | Same as in month except will not spread if month is zero. | Jan = 0 <br> Wk1 to Wk4 = #missing |

In some embodiments, implementations of the planning software aim to generate an accurate plan. For example, the accuracy of a plan can be dependent on a number of factors, such as: What are the assumptions/drivers used in planning? How frequently the plan is reviewed/updated? Are all the relevant people involved in the process? What is the granularity of planning? Is the plan sufficiently detailed? How much details are required for various elements of a plan? Is there a way to measure the accuracy of plans and fine tune the planning process to generate more accurate plans?

Embodiments can improve this planning by providing driver based planning and aggregating plans from various departments, products, markets, channels, and the like, in real time. These tools can also allow users to view plan data and actual (e.g., observed) data from different perspectives, which can help in achieving the tactical/strategic goals of an organization and/or increase the accuracy of a plan.

At times, setting up multidimensional models can be complex, include specialized resources, and involve a high degree of manual effort. One such complexity includes setting up/adjusting the planning granularity to develop an accurate plan. For example, planning can be done at various granularities (e.g., daily, weekly, monthly, quarterly or yearly), and at detailed levels for other dimensions (e.g., SKU, employee or task level or at a higher product category, job category or project level). For example, planning can involve every line manager/employee in a department or it can be done at a higher level by business unit head.

The granularity of plan, the details in the plan, and the number of people involved in the planning process varies by department, industry, time horizon, purpose and other factors. Some implementations set this granularity of planning based on human intelligence and require significant manual adjustment. However, such a limitation can lead to inaccurate plans and/or large amounts of manual effort (e.g., in creating granular plans for planning elements which don't require granular plans). Embodiments include an automatic mechanism to fine tune planning granularity based on calculated data metrics (e.g., accuracy, for example plan vs actual variance).

In some embodiments, once set, the granularity for cross-sections of the multi-dimensional data can be adjusted (e.g., automatically adjusted). For example, planning data (e.g., in a given scenario) for a cross-section can represent a plan for what the actual data will eventually be. For example, a representative cross-section of plan data can be plan 2018, entity 1-1, and account 1-1 (which includes a combination of members of the dimensions Scenario, Entity, and Account). However, at some point in time, actual data for the cross-section of entity 1-1 and account 1-1 within this cross-section will be available. Further, the actual data can be stored at the lowest granularity (e.g., weekly, daily, or in same cases even hourly). Using the actual data, the planning data can be refined to improve the performance of the plan by adjusting or fine turning the planning granularity for certain cross-sections of data.

In some embodiments, plan data can be input by a user, generated based on the prior year actual data, and/or generated by adjusting (based on forecasted changes) the actual data from the prior year (or prior years). For example, a plan can be prepared based on various factors like strategic goals, existing capacity, prior year actual, and the like. In some embodiments, actual or observed data can be based on transactional data that populates an enterprise business system. For example, actual data can be generated based on transactional data in an Enterprise Resource Planning system (e.g., Oracle® Enterprise Resource Planning Cloud). In some implementations, the transactional data can be populated as an enterprise performs transactions (e.g., executes sales, contracts, and the like). This transactional data can be converted to a format that can be used by the multidimensional model (e.g., using Extraction, Transformation, and Loading or any other suitable data management tool) in some embodiments.

In some embodiments, an algorithm can suggest and automatically adjust granularity settings using a rules-based approach. For example, the algorithm can suggest granularity using certain rules initially to generate training data. As the algorithm is run, the rules can be refined. In some embodiments, a user can define the rules used to suggest and/or automatically adjust granularities. In an example, by default, certain rules can be pre-seeded and the user can configured these rules, such as by entering certain values (e.g., threshold values).

In some embodiments, granularity suggestion and automatic adjustments can be based on a number of metrics. A variance metric can be used that represents a difference between planned data and actual (e.g., observed) data for a data combination. For example, a data combination can represent sales for a particular entity. Over a given time period, a plan can represent the planned sales of the entity over the time period. At some point, actual sales data will be generated for the entity over the time period. Thus, the observed actual sales data can be compared to the planned sales data to determine a variance (e.g., percentage difference). Low variance can indicate that a plan is accurate. In fact, an ideal variance can be zero (e.g., there is no variance between the actual numbers and the planned numbers), however this can be difficult if not impossible to achieve. Minimizing variance can increase plan accuracy.

A high variance can indicate that there is a gap in the planning data, and this may be due to the granularity at which a data combination is planned. An acceptable variance may vary by industries or company standards. In some embodiments, a variance threshold can be input by the user, or in some implementations a default value can be used. For example, a user may define a threshold variance at 5%, and thus a variance >5% can be flagged as a data combination for finer granularity planning (e.g., months to weeks).

In some embodiments, a frequency of occurrence of variance metric can be used that represents a frequency at which the variance metric exceeds the threshold. For example, in some cases, due to external factors, there can be anomalous variance over some periods, which may not be indicative of inaccurate planning. Thus, the accuracy planning can also be determined based on how frequently high variance is occurring (e.g., variance above a threshold). In some implementations, once in last 12 periods may be due to an unexpected external factor, but repeated high variance can again indicate a gap in planning data. In some embodiments, a frequency of occurrence of variance threshold can be input by the user, or in some implementations a default value can be used. For example, any value >2 occurrences can be flagged as a data combination for finer granularity planning (e.g., months to weeks).

In some embodiments, a contribution metric can be used that represents the amount a data combination value contributes to its parent value. As previously disclosed, the dimensions of embodiments of the data model can be hierarchical, and child members can contribute to a parent member. For example, the below table provides an example of an expense hierarchy for an Entity E1 for Year FY18 & period January, where the numbers can be in the thousands. As shown, the Travel and Entertainment Expense is 15% of the total expense, or 15% of the total expense is spent on Travel & Entertainment related expenses. Accordingly, the contribution for Travel and Entertainment Expense is 15% of the total expense (e.g., for this particular combination of entity, year, and period). In some embodiments, Compensation Expense, Travel and Entertainment Expense, and Facilities Expense can each be child members of the parent member Total Expense (e.g., within a dimension, such as measures).

| Entity | E1 |
| Year | FY18 |

-continued

| Period | Jan | |
|---|---|---|
| Compensation Expense | 500 | 76% |
| Travel & Entertainment Expense | 100 | 15% |
| Facilities Expense | 50 | 8% |
| Other Expenses | 10 | 2% |
| Total Expenses | 660 | |

A measure that is contributing highly to the aggregated total value may benefit from being planned at detailed granularity for improving the accuracy of an overall plan. For instance, in a services industry, travel expense contribution varies based on the business model, and some organizations may experience expenses as high as 30% of total expense while other organizations may be as low as 5% of total expense. Here, whether travel expenses should be planned at a detailed granularity (e.g., weeks) depends on the accuracy of the plan. In some embodiments, a contribution percentage threshold can be input by the user, or in some implementations a default value can be used.

In some embodiments, a variance contribution metric can be used that represents the variance in the amount a data combination value contributes to its parent value. For example, a variance contribution metric threshold can indicate an acceptable variance of contribution percentage period-over-period. For instance, travel expense may be planned to be 10% for each period. In an example, it may be observed from actual values that the travel expense is regularly 12%. Here, whether a variance of 2% indicates an inaccurate plan can be defined by the variance contribution metric threshold, which can be input by a user (or a default value can be used).

Figure 12:
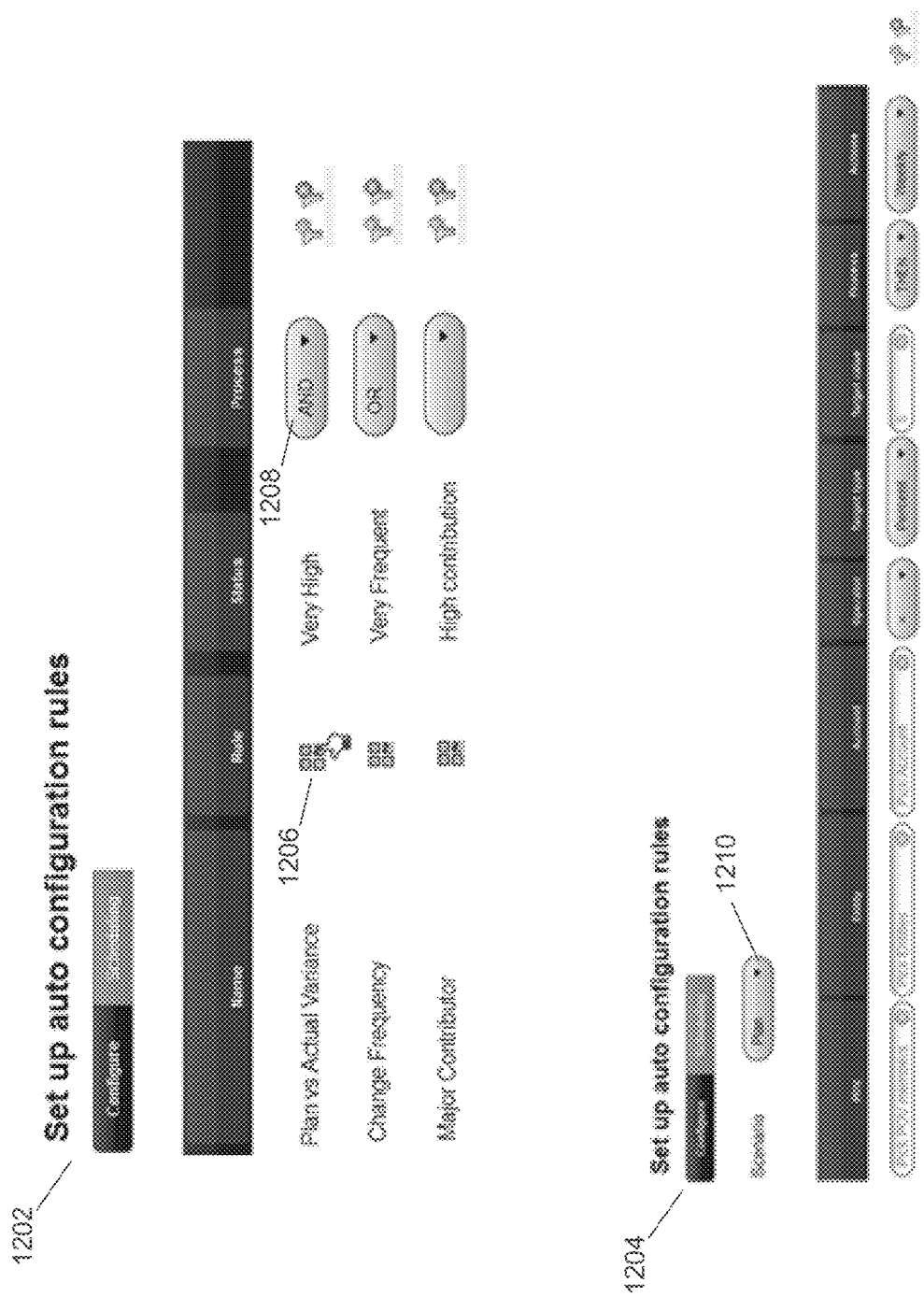
FIGS. 12-14 illustrate example graphical user interfaces for configuring an auto-granularity for combinations of data according to an example embodiment.

Embodiments include user interfaces that can be used to configure auto-granularity of data combinations. With reference to FIG. 12, graphical user interfaces 1202 and 1204 illustrate an interface for configuring auto-granularity for data combinations (e.g., an intersection of data). User interface 1202 illustrates multiple comparisons for an automatic adjustment of granularity (or suggestion for adjustment). For example, three metric comparisons are listed, variance, frequency of occurrence of variance, and contribution, where expression 1208 determines when adjustment occurs based on the comparisons. As explained with reference to FIGS. 15A-15B, a planning granularity adjustment can be determined when the variance meets or exceeds the variance threshold AND either the frequency of occurrence of variance meets or exceeds the corresponding threshold OR the contribution value meets or exceeds the corresponding threshold. User interface 1202 can be used to generate any other suitable series of metric comparisons and expressions to generate any other suitable rules for determining when to perform granularity adjustment.

Figure 13:
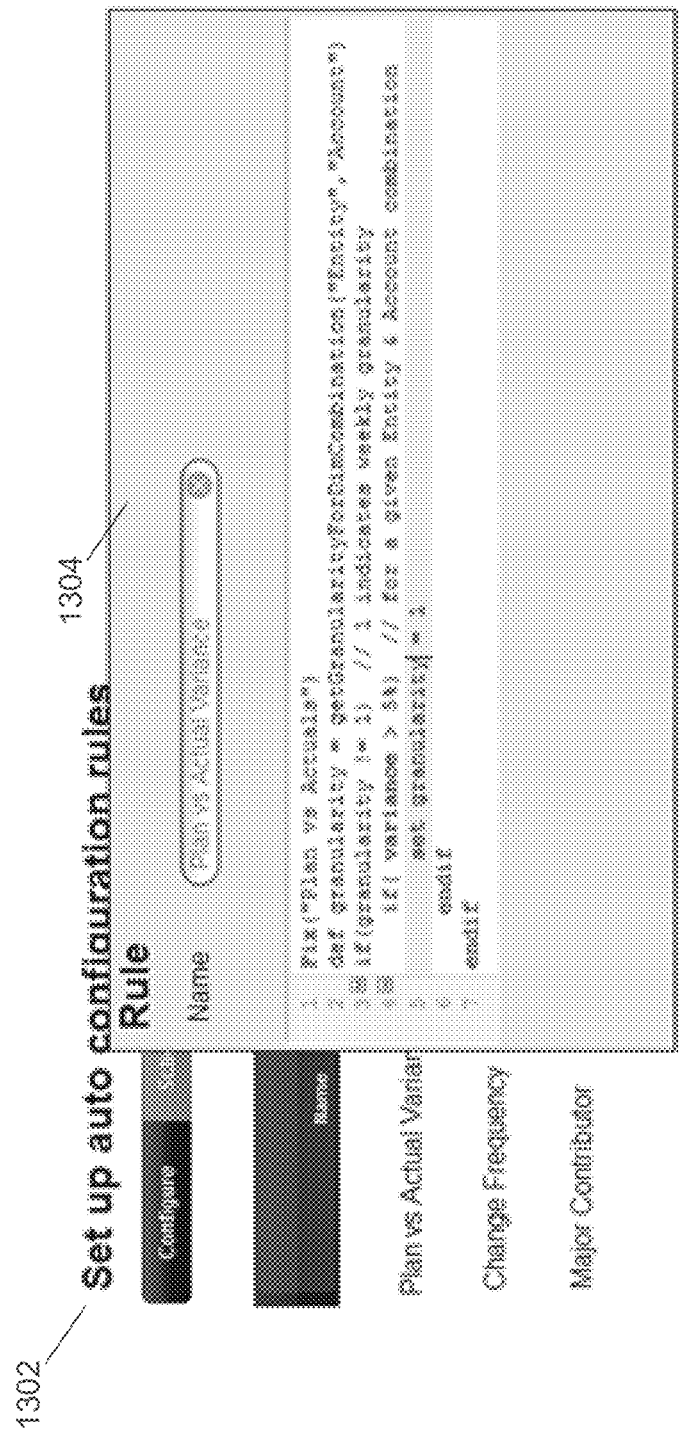

User interface 1204 can be used to configure the metric comparisons. For example, a plan can be selected using element 1210. Further, a point of view (e.g., static member values for non-driver dimensions) can be selected, dimensions such as Entity and Account can be selected, an operator with which to compare the relevant metric value to the threshold can be selected, a target type (e.g., percentage, occurrence, and the like) can be selected, a threshold value can be input, and a resultant action (e.g., adjustment of granularity) can be defined. With reference to FIG. 13, graphical user interfaces 1302 and 1304 can display the logic generated using user interfaces 1202 and 1204 of FIG. 12. In some embodiments, a user can schedule when to evaluate adjustments to the planning granularity. For example, performance of the metric comparisons can be triggered when a current week/month/year is changed, when actual data is loaded, or at any other suitable time.

Figure 14:
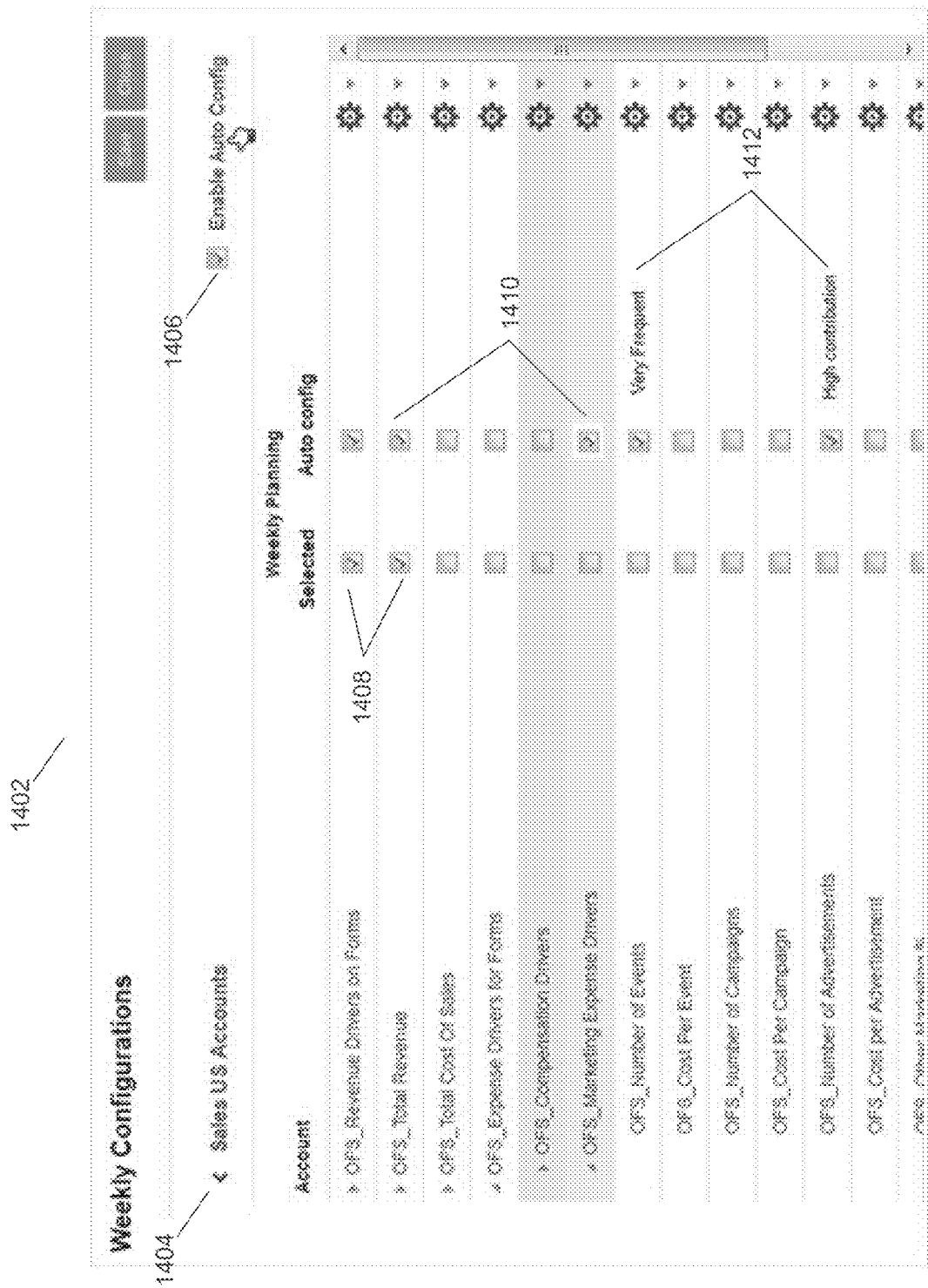

In some embodiments, once auto-granularity is configured, the user is provided with a number of options, such as allowing the auto-granularity to automatically adjust planning granularities for one or more data combinations, setting auto-granularity as providing suggestions about when to adjust planning granularities (which can be overridden by the user), and the like. With reference to FIG. 14, graphical user interface 1402 can be used to set specific data combination granularities (e.g., weekly granularity). For example, combination 1404 can indicate a combination of multi-dimensional data (e.g., scenario, entity, and/or account). User interface 1402 lists a number of individual data combinations (here listed as members of the Account dimension) where planning granularity can be configured. Element 1406 can be used to enable auto-granularity. Once enabled, the planning granularities for the listed data combinations can be selected for auto-granularity, as illustrated by elements 1410. In addition, status 1412 of the data combinations that are based on metric to threshold comparisons (e.g., high frequency of variance, high contribution) can de displayed such that the user can make an informed decision when deciding whether to enable auto-granularity for specific data combinations.

As previously described, weekly planning can be enabled for entity and account combinations and a default granularity can be provided (e.g., monthly). User interface 1420 shows that the "OFS_Number of Events" account is planned at a monthly granularity (e.g., default) while the auto configuration is suggesting to adjust the planning granularity to weekly (e.g., based on a frequent occurrence of high variance).

In some embodiments, users can review granularity decisions against results. In other words, a user can review what the accuracy of a plan is where the suggestion by the system was selected versus the accuracy of the plan where the suggestion was ignored/overridden. For example, suggestions by the auto-granularity can be stored, for example by making each time or per period. In some embodiments, an evaluation of the variance of plan vs actual data can be performed. However, it may be a challenge to evaluate the variance of plan vs actual for combinations where the user chose to override the suggestion since the plan data at that granularity will not be available. An analysis of variance of suggestions made by embodiments vs user overridden decisions can provide a valuable evaluation.

Figure 15A:
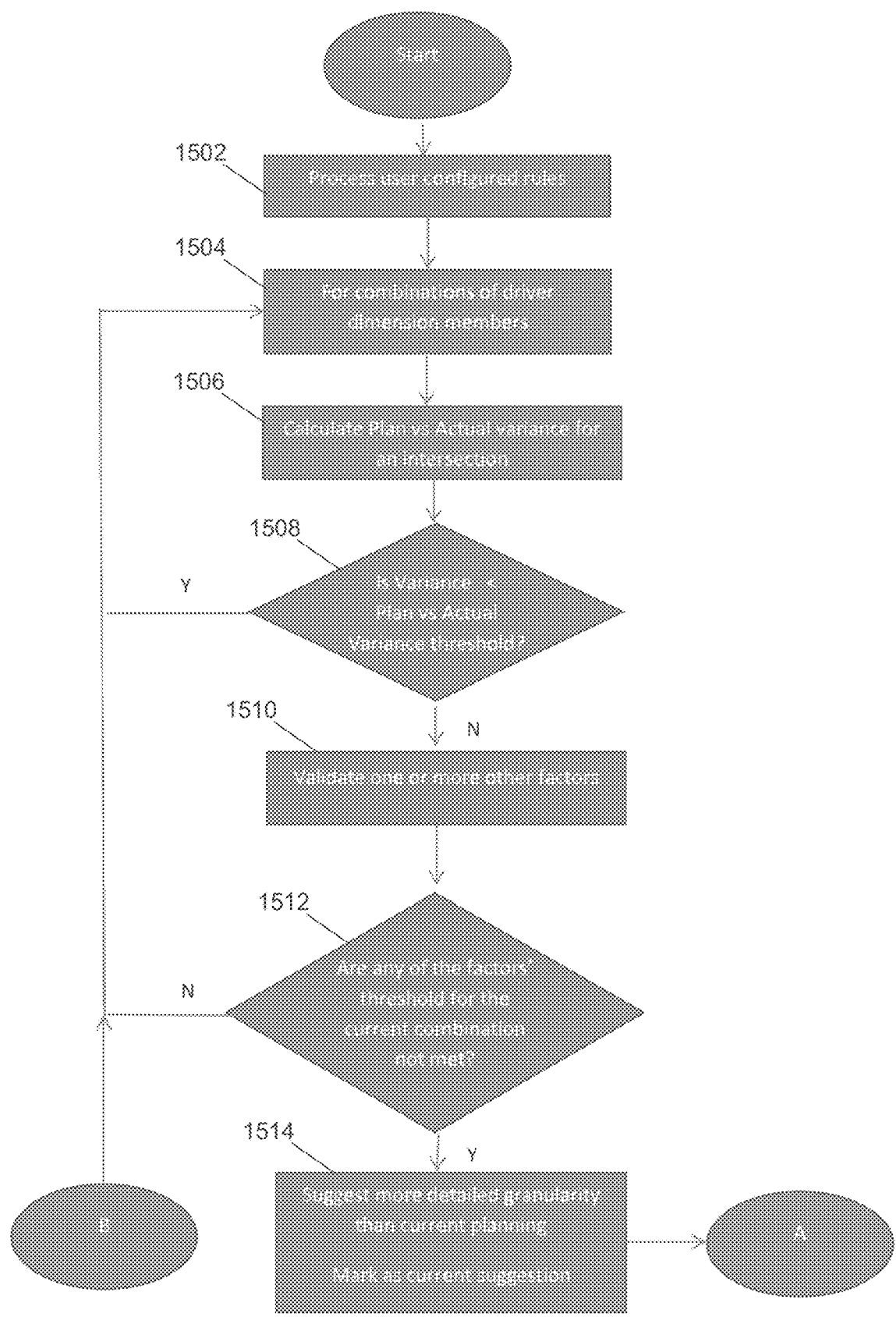
FIGS. 15A-15B illustrate a flow diagram for auto-configuring planning granularities for multi-dimensional data according to an example embodiment.
Figure 15B:
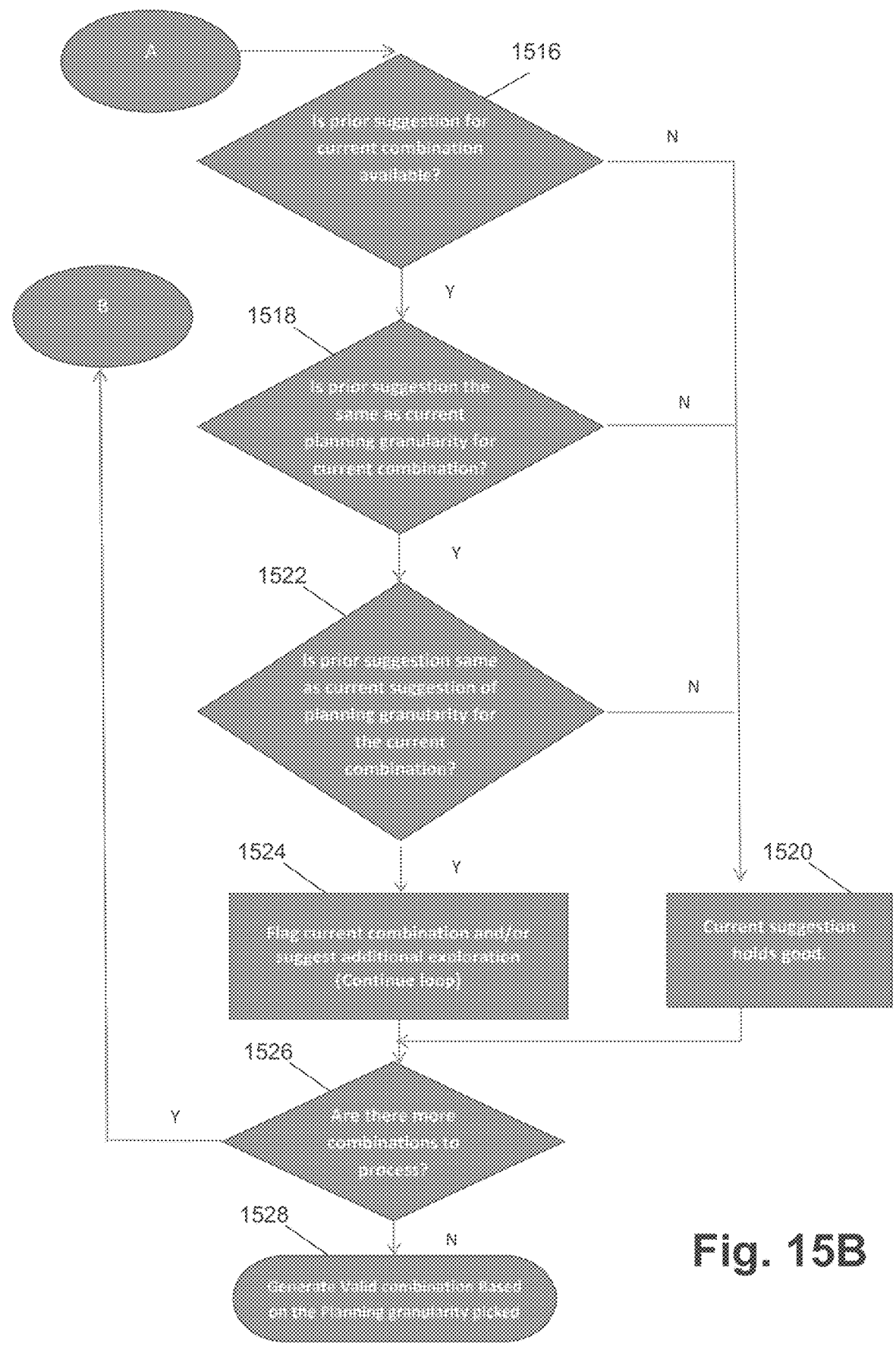

FIGS. 15A-15B illustrate a flow diagram for auto-configuring planning granularities for multi-dimensional data according to an example embodiment. For example, for the flow diagram of FIGS. 15A-15B, the following sample environment can be implemented:

Sample Environment:
1. Period dimension members define the granularity of Planning. For example, Descendants(Weekly) can indicate weekly planning and Descendants(Year Total) can indicate monthly planning.
2. There is a dimension for Scenario with 2 members Plan & Actuals (e.g., observed data).
3. Plan Data is available in Plan Scenario & Actual data for the past periods available in Actuals scenario.
4. Actuals data is available at the lowest granularity that can be planned for a measure.
5. Plan data is available at the granularity for which the measures are planned. A function (e.g., conversion calculation) can be used to convert plan data to the lowest granularity as needed.

In some embodiments, the following inputs can be used by the follow diagram of FIGS. 15A-15B.

Input:
1. Supported planning granularity—[e.g., Daily, Weekly, Monthly, Quarterly, Yearly]
2. Planning Horizon—[e.g., 52 weeks or 12 months]
3. List of driver dimensions—Dimensions by which the granularities can vary [e.g., Entity, Account/Measure]
4. Current Period—Actuals loaded till [e.g., FY18->January, FY18->Week4]
5. Point of View (POV) (Member from each dimension except driver dimensions) For example, if a cube has dimensions like Account, Scenario, Version, Year, Period, Entity, Currency & the driver dimensions are Account, Scenario, Period & Entity a member for Version & Currency is input, such as Working & USD.
6. Current planning granularity
7. Prior Suggested planning granularity In some embodiments, the flow diagram of FIGS. 15A-15B can progress as follows:
1. At 1502, user configured rules can be processed:
   a. Update Global threshold for Key [DriverDimension-1 . . . DriverDimension—n]
      i. Plan vs Actual Variance in %
      ii. Acceptable limit of frequency of variance
      iii. Contribution %
      iv. Acceptable limit for change in contribution %
   b. If threshold overridden for combinations of member of driver dimension,
      i. Create key for each combination
      ii. Update thresholds
2. At 1504, for each combination of driver dimension members:
   a. Retrieve Actual & Plan Data for planning horizon [Use POV for other dimensions' members]
   b. At 1506, variance for the intersection (member data combination) can be calculated.
   c. Retrieve threshold for the member combination
   d. At 1508 If (variance<variance threshold)
      i. No change needed. Granularity can be maintained. Return to 1504 for a next combination.
   e. Else, at 1512
      i. Validate for other factors (e.g., frequency of occurrence vs threshold, contribution vs threshold, or contribution variance vs threshold).
      ii. At 1514, if any of the factors exceed threshold for the current combination:
         1. Suggest or automatically adjust to more detailed granularity (if the current granularity is not the lowest granularity).
   f. Store output of the prediction against the driver dimension member combination for the current period i.e., the new granularity will be the current suggestion.
   g. At 1516, if (prior suggestion of planning granularity for current combination is not available)
      i. At 1520, current suggestion holds. Progress to 1526.
   h. Else, at 1518
      i. If (prior suggestion of planning granularity is not same as current planning granularity for the current combination)
         1. At 1520, current suggestion holds. Progress to 1526.
      ii. Else, at 1522
         1. If (prior suggestion is not same as current suggestion of planning granularity for the current combination)
            a. At 1520, current suggestion holds. Progress to 1526.
         2. Else, at 1524
            a. Suggested planning granularity is same as prior suggested granularity & expected accuracy is not maintained.
            b. Flag combination to the user for further analysis on the other dimensions available for granularity.
   3. At 1526, determine whether there are more combinations to process, and if so return to 1504.
   4. If no more combinations to process, progress to 1528 where valid combination rules can be generated based on the determined/selected planning granularities.

Output:
Planning granularity for driver dimension combinations (which provides the valid combinations of member intersections that will be valid for the planning).

In some embodiments, the output of auto-granularity/suggestion can be the planning granularity for combinations of data. For example, the output granularity can be ultimately used to create valid combinations of members from driver dimensions (e.g., that can allow end users to enter data at the appropriate intersections). For example, FIG. 11 illustrates a flow diagram for determining valid data combinations according to an example embodiment. The output of the auto-granularity flow can provide a valid data combinations algorithm with a data combination specific (e.g., intersection specific) granularity for use when combining multi-dimensional data according to a selection.

In some embodiments, when auto-granularity is enabled, a user does not need to individually selected data combinations for weekly planning. Instead, the planning granularities can be set to larger granularities (e.g., yearly, quarterly, monthly) and the auto-granularity functionality can automatically adjust (or suggest) setting the granularities to finer settings.

A sample implementation of the auto-granularity functionality follows. Sample input can include supported planning granularities (e.g., daily, weekly, monthly, quarterly, yearly), or this may be determined/retrieved. A list of driver dimensions can be provided, such as [Entity, Account]. A current period can also be provided (e.g., current month) such as 11, or November. In some embodiments, a planning horizon is provided, such as 12 months. Actual and plan data (e.g., data files, database access) at a specified granularity (e.g., monthly, weekly, and the like) can also be accessed.

FIG. 16 illustrates sample plan and observed data according to an embodiment. For example, actual data 1602 illustrates a POV, and a current period of November. Thus, the actual data has values from FY18 January to FY18 October. Plan data 1604 has values from FY18 January to FY18 December. FIG. 17 illustrates current and prior suggested planning granularities according to an embodiment. For example, entity 1702 and account 1704 show the combinations of the driver dimensions. Current granularity 1706 shows the current planning granularity per combination and prior suggestion 1708 shows the prior suggested planning granularity per combination. In a sample implementation, "3" indicates a monthly planning granularity and "2" indicates a Weekly planning granularity for current granularity 1706 and prior suggestion 1708.

FIG. 18 illustrates comparison metric thresholds for combinations of data according to an embodiment. For example, entity 1802 and account 1804 show the combinations of the driver dimensions. Variance 1806 and contribution 1808 show the variance metric thresholds and contribution metric thresholds, respectively, per driver dimensions' combination. Similarly, variance contribution 1810 and high variance frequency 1812 show the calculated contribution variance metric threshold and frequency of occurrence of high variance metric threshold, respectively, per driver dimensions' combination. In some embodiments, a user can input or edit default values for various parameters (Variance, Contribution and the like). In such a case, the algorithm can implement the user inputted values for new combinations (e.g., when the algorithm is next executed). In some embodiments, based on the actual data and plan data, the variance metric, contribution metric, variance contribution metric, and frequency of occurrence of high variance metric can be calculated, and each can be compared to its respective threshold.

FIG. 19 illustrates auto-granularity suggestions for combinations of driver dimensions according to an embodiment. For example, entity 1902 and account 1904 show the combinations of the driver dimensions. Current granularity 1906 shows the current granularity per driver dimension. Suggested granularity 1908 shows the suggested granularity based on the calculated metrics, compared thresholds, and evaluated rules. In a sample implementation, "3" indicates a monthly planning granularity and "2" indicates a Weekly planning granularity for current granularity 1906 and suggested granularity 1908.

Reason 1910 shows the reasons for the suggested granularity. In some embodiments, the suggested granularity can be automatically selected for one or more combinations of data (e.g., based on a previous setting by the user).

Figure 20:
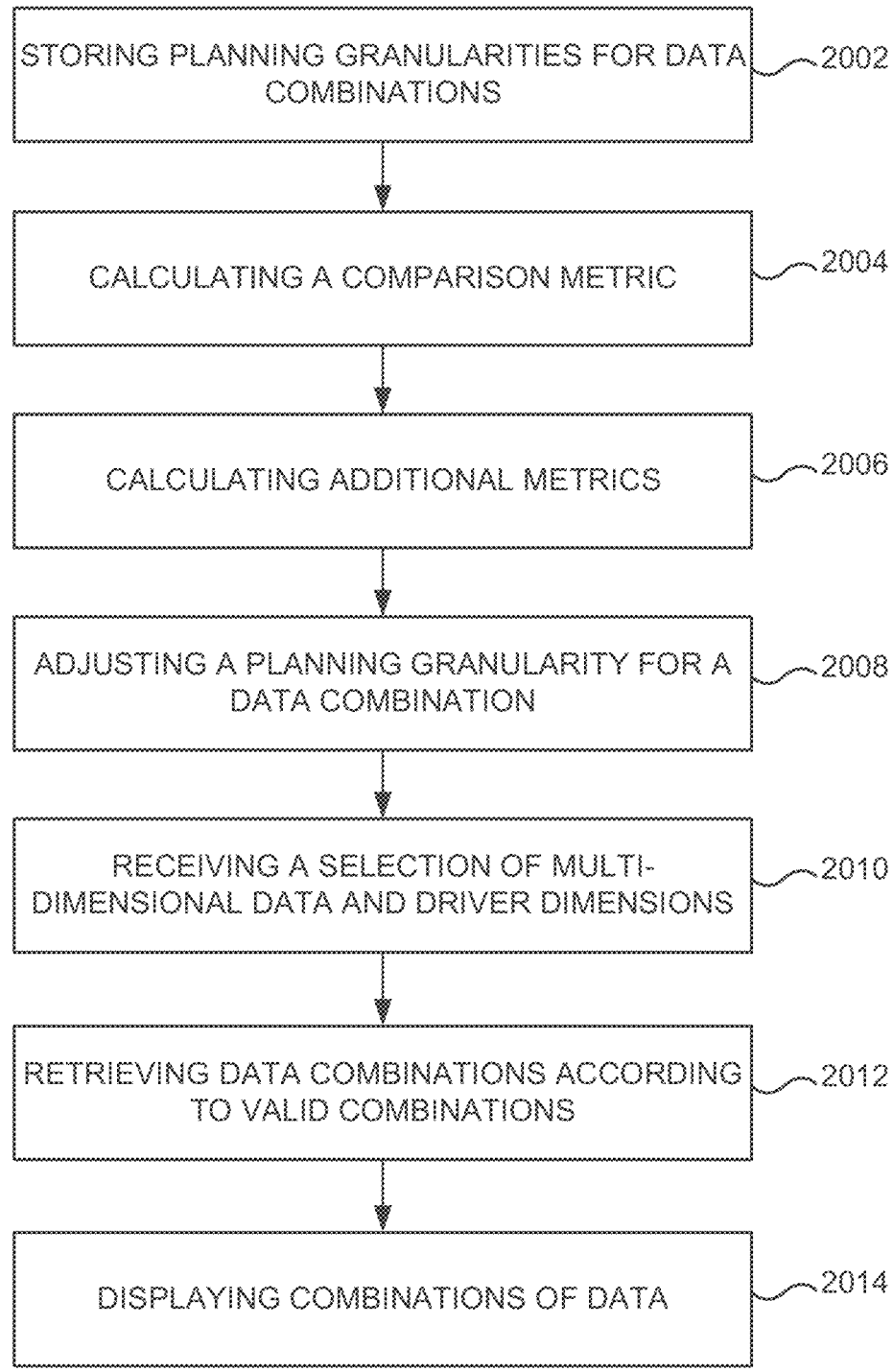
FIG. 20 illustrates a flow diagram for configuring data granularities for multi-dimensional data according to an example embodiment

FIG. 20 illustrates a flow diagram for configuring data granularities for multi-dimensional data according to an example embodiment. At 2002, planning granularities for data elements can be stored including a first granularity for a first data combination, the first data combination including a combination of multiple dimensions of data. For example, the data model can include a plurality of dimensions (e.g., Entity, Accounts, Scenario, Year, Granularity, Period, and the like), that are, in some embodiments, hierarchical. Granularities can be received for data elements of the data model. For example, a granularity can be received for entity 1-1, a member of Entity. In another example, a granularity can be received for plan 2017, entity 1-1, and account 1-1 (which includes a combination of members of the dimensions Scenario, Entity, and Account). In some embodiments, a user can provide a selection for a cross-section of data, and a user interface can be configured to display data for the first data combination at the first granularity based on the stored planning granularities.

At 2004, a comparison metric can be calculated between planned data at the first granularity for the first data combination and actual data observed for the first data combination, wherein the observed data is stored at a different granularity than the planned data. For example, planned data can represent a plan for a given data combination, and the actual observed data can be the actual occurrence of the data combination (e.g., planned sales of a given entity versus actually occurring sales of the given entity). In an embodiment, the comparison metric can be a variance (e.g., difference, in a percentage) between the planned sales and the actual sales. The variance can be compared to a variance threshold to determine whether the planning data has a variance that exceeds the threshold.

In an embodiment, the planned data and actual observed data for the first data combination can be generated based on a Point of View for other dimensions. For example, if the first data combination represents a cross-section of a particular member of a first dimension and a particular member of a second dimension, the Point of View may be static values for two additional dimensions. In this example, the planned data can be a cross-section of data for the particular member of the first dimension, the particular member of the second dimension, the static values for the two additional dimensions, and a planning scenario. Similarly, the actual observed data can be a cross-section of data for the particular member of the first dimension, the particular member of the second dimension, the static values for the two additional dimensions, and an observed or actual scenario.

At 2006, one or more additional metrics can be calculated for the first data combination. For example, a second comparison metric between planned data at the first granularity for the first data combination and actual data observed for the first data combination can be calculated. The second comparison metric can be a frequency of occurrence of variance (e.g., variance above a threshold) between the planned data for the first data combination at the first granularity and the actual data observed for the first data combination. The frequency of occurrence of variance can be compared to a frequency of occurrence of variance threshold to determine whether the planning data has a frequency of occurrence of variance that exceeds the threshold.

In some embodiments, a contribution metric can be calculated for the first data combination. For example, the contribution metric can be a percentage at which the first data combination contributes to a higher level data combination (e.g., within the hierarch) in the selected cross-section of data. The contribution metric can be compared to a contribution threshold to determine whether the planning data has a contribution metric that exceeds the threshold.

At 2008, based on the calculated comparison, the planning granularity for the first data combination can be adjusted from the first granularity to a second granularity based on the calculated metric(s). For example, the planning granularity for the first data combination can be adjusted from the first granularity to the second granularity when the variance metric exceeds the variance threshold. In some embodiments, the first granularity is a monthly granularity and the second granularity is a weekly granularity.

In some embodiments, the planning granularity for the first data combination can be adjusted from the first granularity to the second granularity when the variance metric exceeds the variance threshold and the frequency of occurrence of variance exceeds the frequency of occurrence of variance threshold. In some embodiments, the planning granularity for the first data combination can be adjusted from the first granularity to the second granularity when the variance metric exceeds the variance threshold and at least one of the frequency of occurrence of variance exceeds the frequency of occurrence of variance threshold or the contribution metric exceeds a contribution threshold.

In some embodiments, the planning granularity for the first data combination is automatically adjusted based on one or more of the metric comparisons. For example, the planning granularity can be automatically adjusted based on a preselected setting for the first data combination by a user.

At 2010, a selection of a cross-section of data spanning a plurality of dimensions in the multi-dimensional data model can be received, the selection including the first data combination. For example, a selection of members of a plurality of dimensions (e.g., Entity, Accounts, Scenario, Year, Granularity) can be received from a user that includes the first data combination. In some embodiments, one or more driver dimensions of the data model for the selection can be received. For example, one or more dimensions can be received from a user that represent the driver dimensions for the selection.

At 2012, data combinations can be retrieved according to valid combinations rules. For example, based on the driver dimensions and the planning granularities for data elements, a data structure can be generated that includes a plurality of rules for evaluating a validity of combinations that include a Period dimension of the multi-dimensional data model. In some embodiments, the data structure can include a rule that indicates a given data granularity as valid for a particular data combination and as invalid for other data granularities. For example, data granularities can represent members of the period dimension (e.g., weekly, monthly), and, for a particular data combination, the granularity can be valid for one of these members and invalid for other members.

In some embodiments, it can be determined at a subset of data combinations indicated by the selection of the cross-section of data are invalid based on the rules. For example, combinations of data according to the selection can be performed, where the subset of data combinations is filtered from the performed combinations of data. In some embodiments, filtering the subset of data combinations can include retrieving data combinations indicated by the selection of the cross-section of data from a database (e.g., using an SQL query), and filtering the subset of data combinations from the retrieved data according to the valid combination rules.

In some embodiment, the rules are updated based on the planning granularity for the first data combination being adjusted, and the updated rules indicate that the first data combination is valid for the second granularity and invalid for the first granularity. For example, combinations involving the first data combination and the first granularity can be filtered from the performed combinations of data based on the updated rules. At 2014, in a user interface, data can be displayed for the first data combination at the second granularity based on the adjusting. For example, the performed and filter data combinations (e.g., valid data combinations) can be displayed in the user interface according to the received selection.

The presented embodiments provide a number of benefits over conventional systems. In other multidimensional models, the system often requires a user to choose the granularity of planning at application level and it applies to various data combinations without customization (e.g., cubes (plurality of dimensions of data), years, accounts, and other dimensions). For example, weekly planning may create a simple structure in the period dimension with 52 level 0 members. However, this presents issues for users.

The lack of customization does not allow users to plan/forecast specific combinations of member dimensions (e.g., specific combinations of scenario, year, account, and the like) at different granularities and/or fails to allow proper comparison of different combinations of member dimensions that are planned at different granularities. For example, because the conventional approach lacks the functionality of the flexible period dimension (with weekly, monthly, quarterly, and/or yearly members) and valid combinations rules, both detailed in various embodiments, this approach cannot retrieve data for a cross-section of dimensions that includes different granularities for different dimension member combinations, filter the retrieved data based on the combinations predetermined to be "valid", and display this filtered data. In another example, each year the number of weeks per month vary, and thus, the conventional approaches, such as generating 0 to 52 members of the Period dimension, fail to enable proper year over year comparisons. Disclosed week to month conversions provide a technique for achieving the proper year to year comparison for data combinations planned/forecasted at different granularities.

Embodiments address the technical challenge of supporting mixed granularity for multidimensional models based on specifically customizable configurations, which can vary by customers, use case, and multiple dimensions in a multidimensional model. Embodiments dynamically generate valid combination rules. These rules drive the mixed granularity data management, making it efficient and feasible for users to define mixed granularity data in a multidimensional model. In addition, embodiments provide techniques that can easily scale for large dimensions/multiple dimensions based on the exclusion provided by the valid combination rules (which drive the mixed granularity functionality).

Embodiments incorporate weekly planning that solve challenges customer/users typically have in multidimensional models when planning at this granularity, as illustrated by the following use cases. A first use case for weekly planning is for sales and revenue planning, especially in industries such as retail, consumer goods ("FMCG"), and hotels and hospitality, where sales is tracked and planned on a weekly basis. Often weekly plans are derived from an overall monthly target planning. The sales planned on a weekly basis is then allocated by sales representatives and an organization will start to track performance against the plan. Eventually this can be considered for the monthly revenue plan for finance and overall management reporting. Weekly planning is relevant for various business models as well (e.g., subscription based sales, occupancy based sales, pure volume based sales).

A second use case considers the flexibility to plan marketing spending and associated revenue/uplift volumes from these marketing projects/campaigns. Identifying this correlation can be beneficial as a user or customer considers building marketing planning business processes or provides financials/project frameworks for these.

In a third use case, consider that, often, the treasury or cash function in a finance department performs a weekly plan of receipts and payments to understand the surplus or shortfall and manage working capital needs. This is an exercise to bring in all expected cash inflow and outflow for next week, and see how the shortfall is to be financed or excess is invested to optimize the overall cost of capital. This planning can sometimes be done using spreadsheet software, but it is time consuming.

In a fourth use case, information technology ("IT") services often track their consulting utilization and plan on a weekly basis. This can allow the overall project activity from a financial standpoint to be better understood.

In a fifth use case, sales and operations planning ("S&OP") processes are often done on a weekly cycle, where the weekly demand and supply plan for finished goods are matched to ascertain shortfall and necessary scenario adjustments to plan for the shortcomings. While the overall process can at times be monthly in S&OP, it would be beneficial to break it down to ascertain the weekly supply and demand, and to ascertain the capacity, resource, and other constraints per week. The weekly results could then be rolled up into monthly data for comparisons.

In a sixth use case, weekly level planning is often done for a subset of accounts, typically sales and margin or in an operational model the key drivers of the application. In financial models, weekly planning is often done for "variable" accounts where fixed costs are typically planned monthly. Thus, the granularity of planning for different accounts may vary by entity, as detailed herein.

The robust functionality provided by the described embodiments are beneficial in the above-noted use cases. In particular, the multi-dimensional data model and valid combinations filter presented by the disclosed embodiments provides granularity mixing that enable a number of functions that conventional approaches fail to provide.

Embodiments that provide these functions improve the ability of software to model, forecast, and otherwise predict organizational outcomes in a manner that provides decision makers relevant and useful data analytics. In particular, multi-dimensional data models that include sophisticated structures (such as hierarchical dimension members) can be cumbersome when software is asked to combine different elements of the data model. Some embodiments presented include granularities that are specific to certain combinations of data (e.g., a first granularity for entity 1 and account 1 and a second granularity for entity 1 and account 2), which further complicates the task of providing custom cross-sections of data.

The disclosed embodiments leverage configurable granularity to provide improved flexibility to represent organizational behavior while also maintaining an agile data model that allows different dimensions of data to be combined. The functionality of embodiments to provide user requested custom cubes of data without concern for incompatible granularities provides advantages over conventional approaches. For example, the combination of the disclosed data model and valid combination rules filter enable embodiments to better forecast, model, and predict organizational change, for example using scenario planning. The generated data structure that stores the valid combinations rules also provides a simplified approach to retrieving custom combinations of data that effectively manages the otherwise cumbersome tasks of combining highly configured data (e.g., entities that have different granularities depending on the requested cross-section of data).

Embodiments configure data granularities for multi-dimensional data. For example, a first data element can have a weekly granularity while a second data element has a monthly, quarterly, or yearly granularity. Selections can be received for cross-sections of data that involve, for example, the display of various data elements and/or combinations of data elements. In some embodiments, the data model can include a plurality of dimensions of data, such as entity, accounts, products, scenario, year, period, and the like. An example selected cross-section of data can include a combination of a given scenario, entity, and account. Embodiments include managing data granularities by generating a plurality of rules for valid data combinations that can be used to filter the data retrieval.

In some embodiments, granularity for combinations of data can be automatically configured. For example, software can be implemented that accomplishes planning, such as planning scenarios for an organization. In some embodiments, data granularities can include granularities for combinations of planning data. For example, one of the dimensions of the multi-dimensional data model can be scenario, and the scenario dimension can include one or more member planning scenarios. A planning granularity for various cross-sections of data with a member planning scenario can be set.

In some embodiments, observed data can be compared to the planned data at the set planning granularity. For example, one or more data metrics can be calculated based on the comparison of data. Using the one or more data metrics, planning granularities can be adjusted. For example, planning granularities for cross-sections of data can be automatically adjusted when a comparison between the observed data for the cross-section and the planned data at the set planning granularity indicates that a finer planning granularity would result in improved performance.

Some embodiments include a hierarchical multi-dimensional data model, where the plurality of rules for valid data combinations can include specific rules about parent nodes and child nodes. Thus, the valid combination rules can be used to manage mixed granularities among combinations of hierarchical data elements. In these embodiments, the hierarchical multi-dimensional data model can also include planning data with planning granularities that can be automatically set based on comparisons with observed data.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for configuring data granularities for a multi-dimensional data model, the method comprising:
  storing planning granularities for data elements including a first granularity for a first data combination, the first data combination comprising a combination of multiple dimensions of data, wherein a user interface is configured to display data for the first data combination at the first granularity;
  calculating a variance metric between planned data at the first granularity for the first data combination and actual data observed for the first data combination, wherein the observed data is stored at a different granularity than the planned data;
  calculating a frequency of occurrence metric between planned data at the first granularity for the first data combination and actual data observed for the first data combination, wherein the frequency of occurrence metric comprises a frequency of occurrence of variance between the planned data for the first data combination at the first granularity and the actual data observed for the first data combination;
  automatically adjusting the planning granularity for the first data combination from the first granularity to a second granularity when the variance metric meets or exceeds a first threshold and the frequency of occurrence metric meets or exceeds a second threshold; and receiving a selection of a cross-section of data spanning a plurality of dimensions in the multi-dimensional data model, the selection including the first data combination, wherein a user interface is configured to display data for the first data combination at the second granularity based on the adjusting.

2. The method of claim 1, wherein the first granularity is a monthly granularity and the second granularity is a weekly granularity.

3. The method of claim 1, further comprising:
displaying, in a user interface, data for the first data combination at he second granularity based on the adjusting.

4. The method of claim 1, wherein the planning granularity is automatically adjusted based on a preselected setting for the first data combination by a user.

5. The method of claim 1, wherein the frequency of occurrence metric comprises a number of occurrences over a predetermined window where the variance metric meets or exceeds the first threshold.

6. The method of claim 1, further comprising:
calculating a contribution metric for the first data combination, wherein the contribution metric comprises a percentage at which the first data combination contributes to a higher level data combination in the selected cross-section of data, and the planning granularity for the first data combination is adjusted from the first granularity to the second granularity when the variance metric meets or exceeds the first threshold and at least one of the frequency of occurrence metric meets or exceeds the second threshold or the contribution metric meets or exceeds a third threshold.

7. The method of claim 1, further comprising:
receiving one or more driver dimensions of the multi-dimensional data model for the selection;
generating, based on the driver dimensions and the planning granularities for data elements, a data structure that comprises a plurality of rules for evaluating a validity of combinations that include a Period dimension of the multi-dimensional data model.

8. The method of claim 7, further comprising:
determining that a subset of data combinations indicated by the selection of the cross-section of data are determined to be invalid based on the rules; and
performing combinations of data according to the selection, wherein the subset of data combinations is filtered from the performed combinations of data.

9. The method of claim 8, wherein the rules are updated based on the planning granularity for the first data combination being adjusted, the updated rules indicating that the first data combination is valid for the second granularity and invalid for the first granularity.

10. The method of claim 9, wherein combinations involving the first data combination and the first granularity are filtered from the performed combinations of data based on the updated rules.

11. The method of claim 6, wherein the contribution metric comprises a percentage at which the first data combination contributes to a parent data combination in the selected cross-section of data according to a hierarchical structure for the multi-dimensional data model.

12. A non-transitory computer readable medium having instructions stored thereon that, when executed by a processor, cause the processor to configure data granularities for a multi-dimensional data model, wherein, when executed, the instructions cause the processor to:

store planning granularities for data elements including a first granularity for a first data combination, the first data combination comprising a combination of multiple dimensions of data, wherein a user interface is configured to display data for the first data combination at the first granularity;

calculate a variance metric between planned data at the first granularity for the first data combination and actual data observed for the first data combination, wherein the observed data is stored at a different granularity than the planned data;

calculating a frequency of occurrence metric between planned data at the first granularity for the first data combination and actual data observed for the first data combination, wherein the frequency of occurrence metric comprises a frequency of occurrence of variance between the planned data for the first data combination at the first granularity and the actual data observed for the first data combination;

automatically adjust the planning granularity for the first data combination from the first granularity to a second granularity when the variance metric meets or exceeds a first threshold and the frequency of occurrence metric meets or exceeds a second threshold; and receive a selection of a cross-section of data spanning a plurality of dimensions in the multi-dimensional data model, the selection including the first data combination, wherein a user interface is configured to display data for the first data combination at the second granularity based on the adjusting.

13. The computer readable medium of claim 12, wherein the first granularity is a monthly granularity and the second granularity is a weekly granularity.

14. The computer readable medium of claim 12, wherein the frequency of occurrence metric comprises a number of occurrences over a predetermined window where the variance metric meets or exceeds the first threshold.

15. The computer readable medium of claim 12, wherein the instructions further cause the processor to:
calculate a contribution metric for the first data combination, wherein the contribution metric comprises a percentage at which the first data combination contributes to a higher level data combination in the selected cross-section of data, and the planning granularity for the first data combination is adjusted from the first granularity to the second granularity when the variance metric meets or exceeds the first threshold and at least one of the frequency of occurrence metric meets or exceeds the second threshold or the contribution metric meets or exceeds a third threshold.

16. The computer readable medium of claim 15, wherein the contribution metric comprises a percentage at which the first data combination contributes to a parent data combination in the selected cross-section of data according to a hierarchical structure for the multi-dimensional data model.

17. A system for configuring data granularities for a multi-dimensional data model, the system comprising:
a processor; and
a memory storing instructions for execution by the processor, the instructions configuring the processor to:
store planning granularities for data elements including a first granularity for a first data combination, the first data combination comprising a combination of multiple dimensions of data, wherein a user interface is configured to display data for the first data combination at the first granularity;

calculate a variance metric between planned data at the first granularity for the first data combination and actual data observed for the first data combination, wherein the observed data is stored at a different granularity than the planned data;

calculating a frequency of occurrence metric between planned data at the first granularity for the first data combination and actual data observed for the first data combination, wherein the frequency of occurrence metric comprises a frequency of occurrence of variance between the planned data for the first data combination at the first granularity and the actual data observed for the first data combination;

automatically adjust the planning granularity for the first data combination from the first granularity to a second granularity when the variance metric meets or exceeds a first threshold and the frequency of occurrence metric meets or exceeds a second threshold; and receive a selection of a cross-section of data spanning a plurality of dimensions in the multi-dimensional data model, the selection including the first data combination, wherein a user interface is configured to display data for the first data combination at the second granularity based on the adjusting.

18. The system of claim 17, wherein the frequency of occurrence of variance comprises a number of occurrences over a predetermined window where the variance metric meets or exceeds the first threshold.

19. The system of claim 17, wherein the instructions further configure the processor to:

calculate a contribution metric for the first data combination, wherein the contribution metric comprises a percentage at which the first data combination contributes to a higher level data combination in the selected cross-section of data, and the planning granularity for the first data combination is adjusted from the first granularity to the second granularity when the variance metric meets or exceeds the first threshold and at least one of the frequency of occurrence metric meets or exceeds the second threshold or the contribution metric meets or exceeds a third threshold.

20. The system of claim 19, wherein the contribution metric comprises a percentage at which the first data combination contributes to a parent data combination in the selected cross-section of data according to a hierarchical structure for the multi-dimensional data model.

* * * * *

UNITED STATES PATENT AND TRADEMARK OFFICE
CERTIFICATE OF CORRECTION

PATENT NO. : 11,636,130 B2
APPLICATION NO. : 16/146123
DATED : April 25, 2023
INVENTOR(S) : Daga et al.

It is certified that error appears in the above-identified patent and that said Letters Patent is hereby corrected as shown below:

In the Specification

In Column 2, Line 48, delete "CORKS" and insert -- COMPUTER NETWORKS --, therefor.

In Column 4, Lines 48-49, delete "Hadoop File System ("HFDS")," and insert -- Hadoop Distributed File System ("HDFS"), --, therefor.

In Column 5, Line 2, delete ""Account'," and insert -- "Account", --, therefor.

In Column 8, Line 16, delete "weeks" and insert -- weeks. --, therefor.

In Column 10, Line 38, delete "weekly." and insert -- weekly). --, therefor.

In Column 11, Line 2, delete "Explaination" and insert -- Explanation --, therefor.

In Column 16, Line 14, delete ""Account",dimenson:" and insert -- "Account",dimension: --, therefor.

In Column 21, Line 39, delete "same" and insert -- some --, therefor.

In Column 24, Line 24, delete "de" and insert -- be --, therefor.

In the Claims

In Column 33, Line 15, in Claim 3, delete "he" and insert -- the --, therefor.

Signed and Sealed this
Twentieth Day of February, 2024

Katherine Kelly Vidal
*Director of the United States Patent and Trademark Office*